United States Patent
Nabavi et al.

(10) Patent No.: US 12,005,422 B2
(45) Date of Patent: Jun. 11, 2024

(54) GAS CAPTURE USING POLYMERIC PARTICLES

(71) Applicant: Charmstar Cambridge Limited, Cambridge (GB)

(72) Inventors: Seyed Ali Nabavi, Cranfield (GB); Goran Vladisavljevic, Loughborough (GB); Vasilije Manovic, Bedford (GB)

(73) Assignee: CHARMSTAR CAMBRIDGE LIMITED, Cambridge (GB)

( * ) Notice: Subject to any disclaimer, the term of this patent is extended or adjusted under 35 U.S.C. 154(b) by 222 days.

(21) Appl. No.: 16/312,903

(22) PCT Filed: Jun. 23, 2017

(86) PCT No.: PCT/GB2017/051850
§ 371 (c)(1),
(2) Date: Dec. 21, 2018

(87) PCT Pub. No.: WO2017/221030
PCT Pub. Date: Dec. 28, 2017

(65) Prior Publication Data
US 2019/0160451 A1    May 30, 2019

(30) Foreign Application Priority Data
Jun. 23, 2016 (GB) .................... 1610994

(51) Int. Cl.
  *B01J 20/26*   (2006.01)
  *B01D 53/02*   (2006.01)
  *B01J 20/28*   (2006.01)
  *B01J 20/30*   (2006.01)

(52) U.S. Cl.
  CPC ........... *B01J 20/267* (2013.01); *B01D 53/02* (2013.01); *B01J 20/268* (2013.01); *B01J 20/28016* (2013.01); *B01J 20/28019* (2013.01); *B01J 20/3057* (2013.01); *B01J 20/3071* (2013.01); *B01J 20/3085* (2013.01); *B01D 2253/202* (2013.01); *B01D 2257/108* (2013.01); *B01D 2257/302* (2013.01); *B01D 2257/404* (2013.01); *B01D 2257/502* (2013.01); *B01D 2257/504* (2013.01); *B01J 20/262* (2013.01); *Y02C 20/40* (2020.08)

(58) Field of Classification Search
CPC ... B01D 53/02; B01J 20/267; B01J 20/28016; B01J 20/28019; B01J 20/3057; B01J 20/3071; B01J 20/3085; B01J 20/268
See application file for complete search history.

(56) References Cited

U.S. PATENT DOCUMENTS

2009/0281272 A1* 11/2009 Yilmaz ................. B01J 20/285
                                                         528/332
2012/0175798 A1   7/2012 Fukuda et al.
2014/0264984 A1*  9/2014 Kosvintsev ............. B01J 4/007
                                                           264/8

FOREIGN PATENT DOCUMENTS

CN       102258986 A       11/2011
WO    WO-2017106443 A1 *   6/2017 ............ B01J 20/265

OTHER PUBLICATIONS

Zhao et al., Applied Surface Science (2012) v261 p. 708-716.*
Croll et al., Langmuir, (2003), v.19, p. 5918-5922 (.*
Zhao et al., Envir. Sci. Technol., (2014), v48, p. 1601-1608.*
Zhao et al., Envir. Sci. Technol., (2012), v46, p. 1789-1795. (Disclosed in IDS and provided).*
Egidi, E. et al. (2008) "Membrane emulsification using membranes of regular pore spacing: Droplet size and uniformity in the presence of surface shear." Journal of Membrane Science, Elsevier BV, NL, vol. 323, No. 2, pp. 414-420. XP025677294. [Retrieved on Jun. 27, 2008].
Kempe, H. and M. Kempe (2004) "Novel Method for the Synthesis of Molecularly Imprinted Polymer Bead Libraries.", Macromolecular Rapid Communications, vol. 25, No. 1, pp. 315-320, XP055418484. DOI: 10.1002/marc.200300189.
Nabavi, S. A. et al. (2016) "Production of molecularly imprinted polymer particles with amide-decorated cavities for CO2 capture using membrane emulsification/suspension polymerisation." Colloids and Surfaces A: Physicochemical and Engineering Aspects, vol. 521, May 14, 2016 (May 14, 2016), pp. 231-238, XP055416586. Amsterdam, NL. DOI: 10.10.16/j.colsurfa.2016.05.033.
Shum, H.C., et al. (2010) "Droplet Microfluidics for Fabrication of Non-Spherical Particles." Macromolecular Rapid Communications, vol. 31, pp. 108-118. [published online Nov. 24, 2009].
Vladisavljevic, G.T. (2015) "Structured microparticles with tailored properties produced by membrane emulsification." Advances in Colloid and Interface Science, vol. 225, pp. 53-87. [Available online Aug. 20, 2015].
Zhao, Y., et al. (2012) "Synthesis and CO2 Adsorption Properties of Molecularly Imprinted Adsorbents." Environmental Science & Technology, 2012, vol. 46 No. 3, pp. 1789-1795, XP55416590, DOI: 10.1021/es203580b.

(Continued)

*Primary Examiner* — Yong L Chu
(74) *Attorney, Agent, or Firm* — Harness, Dickey & Pierce, P.L.C.

(57) ABSTRACT

Disclosed herein is a method of making a polymeric material for selective adsorption of a gas. The method comprises dissolving a monomer comprising a functional group having an affinity for the gas in a solvent with a cross-linker and an initiator; emulsifying the solution in a liquid which is immiscible with the first solvent; and agitating and heating the emulsion to cause polymerization of the monomer into a cross-linked polymer having nanocavities with functional groups covalently-incorporated on walls thereof. Also disclosed are polymeric particles, an apparatus for forming the particles and a method of adsorbing a selected gas.

24 Claims, 19 Drawing Sheets

(56) References Cited

OTHER PUBLICATIONS

Zhao, Y., et al. (2014) "Adsorption Separation of Carbon Dioxide from Flue Gas by a Molecularly Imprinted Adsorbent." Environmental Science & Technology, vol. 48 No. 3, pp. 1601-1608, X0554416588, DOI: 10.1021/es403871w.

* cited by examiner

GAS CAPTURE USING POLYMERIC PARTICLES

This application is a national phase entry of PCT Application Serial No. PCT/GB2017/051850, filed Jun. 23, 2017, which claims priority to United Kingdom Patent Application Serial No. 1610994.4 filed on Jun. 23, 2016. The entire contents of these applications are incorporated herein by reference in their entirety.

FIELD

This invention relates to an apparatus for and a method of making polymeric materials which can adsorb gases such as carbon dioxide, polymeric materials which can adsorb such gases and a method and apparatus for adsorbing such gases.

BACKGROUND

A number of industrial processes result in generation of gases which may be undesirable to release directly into the atmosphere. One such process is combustion, which can produce large quantities of $CO_2$, for example as a result of fossil fuel combustion in power stations. Steam reforming and food processing are other processes which generate $CO_2$. An increasing level of $CO_2$ in the atmosphere is known to be one of the main causes of global warming and undesirable climate change. Another problematic group of gases, also often produced as a result of fossil fuel combustion, is $NO_x$ (nitric oxide and/or nitrogen dioxide). This is known to cause respiratory problems in humans as a result of it reacting with water vapour to form low-level ozone, and with other compounds to form photochemical smog, and is also implicated in formation of acid rain. A further example is the $SO_x$ group of gases, many of which are toxic. Some of these, for example $SO_2$, are produced from refinement of certain metal ores as well as some combustion processes. These are just examples of some of the many undesirable gaseous bi-products of industrial processes.

One viable solution to reduce the quantity of gases such as those discussed above entering the atmosphere is to capture them from large point sources such as the industrial processes discussed above. One option which has been explored in respect of $CO_2$, for example, is to store it by sequestration in geological formations. However, this solution requires a suitable geological formation to be found, which requires consideration of possible leakage and may result in a need to transport the captured $CO_2$ some distance from where it is being generated, thereby increasing cost and creating further pollution.

An alternative to sequestration of $CO_2$ in gaseous form is to capture the $CO_2$ and convert it into a more compact form. Currently, post-combustion carbon capture by amine scrubbing, for example using monoethanolamine (MEA), can be considered to be the most established technology for the removal of $CO_2$ from flue gases. However, amine solutions are corrosive and degrade into toxic products after repetitive regeneration cycles at elevated temperatures. In addition, amine scrubbing systems exhibit a low specific interfacial area and require high regeneration energy, which can reduce energy output of a plant generating the flue gas by 25-40%.

Solid adsorbents can be attractive alternatives, because they can be nontoxic, nonvolatile and noncorrosive, require lower regeneration energy than an amine scrubber, and display a reasonable surface area-to-volume ratio. Zeolites, activated carbon or mesoporous silica are some widely-explored examples. Attempts have been made to improve the carbon capture ability by physically impregnating or covalently tethering amines inside the mesopores of such structures. However, generally speaking, the presence of moisture in flue gases greatly reduces zeolites' capture capacity, resulting in a requirement for higher regeneration temperatures and hence a high energy penalty. Also, they often present problems with poor $CO_2$ selectivity from a mixed gas stream, as well as displaying a tendency to become unstable after repeated adsorption/regeneration cycles. Moreover, the available surface area for $CO_2$ capture is limited by the surface area of the structure, much of the volume of the structure being inaccessible to a flowing gas.

Another type of known solid adsorbents are metal organic frameworks (MOFs). MOFs may show a high $CO_2$ capture capacity at elevated pressures, but under typical conditions of post-combustion carbon capture, such as flue gas pressure, their capture capacity is reduced, especially in the presence of moisture, $NO_x$ and $SO_x$.

Known solid adsorbents have other drawbacks. One is their low density and small particle size—their application in fluidised bed and moving bed systems is limited due to their ready entertainment in the stream and because they are prone to plugging, channeling, and agglomerating. Small particles belonging to Group C according to the Geldart classification can suffer from these problems. Because of these limitations, fine particles have been prepared as pellets, but such very large particles (Group D in the Geldart classification) have a low surface area-to-volume ratio, resulting in a lower diffusion rate of $CO_2$ within the particle.

Another undesirable effect of small particles of some known solid adsorbents is in fixed bed applications, where they can cause excessive pressure drop through the bed.

Polymer-based materials, such as hyper cross-linked polymers (HCPs), porous aromatic frameworks (PAFs), and covalent organic polymers (COPs) are new classes of $CO_2$ adsorbents characterised by a high $CO_2$ selectivity and capture capacity, high hydrothermal stability and ease of structural modification. However, they suffer from the same drawbacks as other known solid adsorbents just discussed.

Recently, Zhao et al. have produced molecularly imprinted polymer (MIP) particles for $CO_2$ capture using bulk polymerization, as discussed in two papers: (1) Y. Zhao, Y. Shen, L. Bai, R. Hao, L. Dong, Synthesis and CO2 adsorption properties of molecularly imprinted adsorbents, Environ. Sci. Technol. 46 (2012) 1789-1795. doi:10.1021/es203580b and (2) Y. Zhao, Y. Shen, G. Ma, R. Hao, Adsorption separation of carbon dioxide from flue gas by a molecularly imprinted adsorbent, Environ. Sci. Technol. 48 (2014) 1601-1608. doi:10.1021/es403871w. Molecular imprinting creates template-shaped nanocavities within a polymer matrix having molecular recognition properties towards a specific target molecule. However, whilst such materials may show an improved adsorption over other materials described above, the bulk polymerization technique used by Zhao et al. is not suitable for industrial-scale production as it cannot be scaled up from a laboratory process. After polymerization, the resulting bulk polymer must be crushed, ground and sieved to obtain particles of the desired size range, which is time consuming, laborious, and expensive as only 30-40% of the particles can be recovered. In addition, particles produced by this method have irregular shapes and sharp edges and are prone to attrition.

It would be desirable to prepare an adsorbent having particles with improved shape and surface morphology than those known to date. It would also be desirable to provide an adsorbent that has improved stability and particle size, is less corrosive and which can be used to capture a gas with less energy cost than some existing adsorbents. Furthermore, it would be desirable for such an adsorbent to have improved selectivity for a particular gas than some known adsorbents.

Statements

According to one aspect of the current subject-matter, there is provided a method of making a polymeric material for selective adsorption of a gas. The method may comprise: dissolving a monomer comprising a functional group having an affinity for the gas in a solvent with a cross-linker and an initiator; emulsifying the solution in an oil which is immiscible with the solvent; and agitating and providing thermal or light energy to the emulsion to cause polymerization of the monomer into a cross-linked polymer having nanocavities with functional groups covalently-incorporated on walls thereof.

In some implementations, the oil can be a mineral oil. This may be a light or white mineral oil, sometimes termed Paraffinum perliquidum. Some heavy mineral oils (e.g. Paraffinum liquidum) may be suitable.

In many implementations, the polymer is hyper cross-linked or a cross-linked polymer network and/or formed of a polymer matrix. The method for making the polymeric material may be for selective adsorption of one of carbon dioxide; carbon monoxide; nitric oxide; nitrogen dioxide; hydrogen and sulfur dioxide.

The method may further comprise washing the polymer by one or more of: mechanical agitation; ultrasonic agitation; and soxhlet extraction, to remove the oil.

In some examples, providing thermal energy comprises heating at a temperature of at least a decomposition temperature of the initiator. In some examples, providing light energy comprises irradiating with a UV light of an energy density and wavelength of at least a decomposition energy of the initiator.

In some implementations, the emulsifying can comprise forcing the solution through a porous membrane and forming substantially uniformly-sized droplets by controlling a rate of flow through the membrane and a shear force causing relative movement between the membrane surface and the emulsion. The membrane pores may have a diameter of approximately 1-60 microns. Such a membrane may not have a fixed pore spacing or the pores may be spaced with approximately a range of 80-200 microns.

In some examples, the dissolving comprises mixing with a template comprising molecules that are structurally similar to molecules of the gas such that monomer-template complexes are formed. The template molecules may be a structural analogue of one or two or more molecules of the gas. The method may further comprise removing the template, thereby leaving the nanocavities with functional groups having an affinity to target gas molecules. The functional groups may have a high affinity to the target gas molecules, such that they are highly susceptible to physisorbing a target gas molecule.

The solvent can comprise a porogenic solvent in which the monomer, template, cross-linker and initiator have a solubility but which is immiscible with the oil.

In some implementations consistent with the current subject-matter, the method may be for making a polymeric material for selective adsorption of carbon dioxide, wherein the functional group is a carbon-dioxide-philic group which is one of an amide group; an amine group; a carboxyl group; and a hydroxyl group. An amine may be primary, secondary or tertiary. In some cases, the template can be a low molecular weight carboxylic acid, having a molecular weight of between approximately 46 g/mole and 200 g/mole. In some examples, the template is oxalic acid or formic acid. A distance between carbon-dioxide-philic groups of the monomers in the nanocavities may be within a range suitable for hydrogen bonding to a carbon dioxide molecule.

The solvent may be one or more of acetonitrile, dimethylsulfoxide, water, ethanol and methanol. The monomer may be an amine or an amide, optionally selected from acrylamide, diallylamine, allylamine, methacrylamide, 4-vinylaniline and triallyamine. The cross-linker can be selected from ethylene glycol dimethacrylate and N,N'-methylenebis (acrylamide). The initiator may be selected from 2,2'-azobis (2-methylpropionitrile) (AIBN), ammonium persulfate (APS) and di(4-tert-butylcyclohexyl) peroxydicarbonate (Perkadox 16).

In some implementations, the oil may be further immiscible with the monomer and initiator.

In some examples, the agitating can comprise stirring at a speed of between approximately 100 rpm and 1200 rpm. The agitating may comprise stirring at a speed of either between approximately 600 rpm and 1200 rpm or approximately 300 rpm. Approximately can mean to within around the nearest 10 rpm.

In some implementations, the mineral oil can have a dynamic viscosity of between approximately 10 and 20 mPa·s, more preferably between approximately 14 and 20 mPa·s, Other oils of similar viscosities may also be suitable.

According to another aspect, a material may be formed by any of the above-discussed methods in any feasible combination.

According to yet another aspect, there is provided a material comprising particles of irregular, rounded shape formed from clustered and partially-fused spherical or substantially spherical polymer particles and having nanocavities with functional groups having an affinity for a gas covalently incorporated on the walls of the nanocavities, onto which molecules of the gas can be selectively adsorbed.

In many implementations, the polymer is hyper cross-linked or a cross-linked polymer network and/or formed of a polymer matrix. The particles may comprise a structure formed from multiple partially-coalesced droplets clustered together, each droplet comprising multiple monomer molecules. Each partially-coalesced droplet may be formed as any of: pairs of molecules; three molecules; and more than three molecules. At least some of the particles may be one of: generally oblong; generally cuboidal; generally tetrahedral; and generally polyhedral in shape, in dependence on the number of molecules. However, some of the particles may not be of any particular shape. Each droplet may be a mixture additionally comprising solvent, initiator and cross-linker molecules, the solvent initiator and cross-linker having been used to form the particles.

At least half of the particles by volume may have a diameter of approximately 350 microns to 800 microns. In some cases, at least half of the particles by volume may have a diameter of approximately 1200 microns. Depending on the shape, a particle may have two or more different diameters. Some or all of a particle's diameters may fall within these ranges. The values can vary to within a 100 microns or so within the scope of implementations disclosed herein. In some examples, the span of diameters of the particles is approximately 1.4 or lower.

The material may have a Type II or Type IV IUPAC nitrogen adsorption isotherm.

The nanocavities may be smaller than 2 nm, or in some cases smaller than 1 nm, or in some particular cases smaller than 0.7 nm, or between approximately 0.3-1 nm, preferably 0.45-0.7 nm. This may refer to a distance between functional groups on walls of the nanocavities.

The particles may be insoluble in water and can be regenerated by removal of adsorbed gas molecules using temperature and pressure manipulations.

In some implementations, the nanocavities of the material may have been formed by molecular imprinting with a template comprising molecules having structural similarity to molecules of the gas. The template molecules may be a structural analogue of one or more molecules of the gas.

In some implementations, the functional groups of the material are carbon dioxide-philic and the nanocavities have a greater affinity for carbon dioxide adsorption than other molecules in a mixed gas stream. A mixed gas stream can include some or all of the following gases, which are exemplary only: carbon dioxide, oxygen, steam, $SO_x$, $NO_x$, methane, and hydrogen.

In some examples, the template can be a carboxylic acid, optionally selected from oxalic acid or formic acid. The carbon dioxide-philic groups may be one of an amide; and an amine. An amine may be primary, secondary or tertiary. The carbon-dioxide-philic groups may adsorb a carbon dioxide molecule by a noncovalent bond.

In some implementations, the nanocavities can be sized for adsorption of one or more carbon dioxide molecules. A distance between carbon-dioxide-philic groups in the nanocavities can be within a range suitable for hydrogen bonding to a carbon dioxide molecule.

The material may be formed by polymerization of an amide or amine monomer, optionally selected from acrylamide, diallylamine, allylamine, methacrylaminde, 4-vinylaniline and triallyamine.

In some examples, the material may be composed of a cross-linked polymer network. In some examples, the material may be formed of a polymer matrix.

In another aspect, there is provided a method of adsorbing a selected gas from a gas stream comprising a mixture of gases, comprising flowing the gas stream past any of the materials described above, which may have features in any feasible combination of those described above.

In implementing such a method, the material may be in a fixed bed, a moving bed, or a fluidized bed. The gas stream can comprise a mixture of one or more of the following gases: carbon dioxide, oxygen, steam, $SO_x$, $NO_x$, methane, and hydrogen. a temperature of the gas stream is approximately −30° C. to 80° C. At least some of the materials described above are such that they can adsorb a selected gas when the gas stream is at a temperature of approximately −30-80° C. In some particular implementations, the temperature may be approximately −30-60° C. or −30-40° C. or −20-80° C. or −0-80° C. or 0-60° C. or any other range within −30-80° C.

In some examples, the selected gas is carbon dioxide.

In another aspect, the invention relates to an apparatus for producing any of the above-discussed materials. The apparatus may comprise an emulsification apparatus for emulsifying a dispersed phase comprising a monomer in a solvent; and a reactor in which the emulsion can be held, the reactor being arranged to cause polymerization of the monomer.

In some implementations, the emulsification apparatus may comprise a porous membrane having an emulsion-facing surface; a pump arranged for pumping the dispersed phase through the membrane; and a shear forming mechanism arranged to cause relative movement between the membrane surface and the emulsion to create droplets of dispersed phase which are rounded irregular in shape and/or substantially uniform in size.

According to yet another aspect of the present invention, there is provided a method of making a polymeric material for selective adsorption of a gas. The method may comprise dissolving a monomer comprising a functional group having an affinity for the gas in a solvent with a cross-linker and an initiator, emulsifying the solution in a liquid which is immiscible with the solvent, and agitating and providing thermal or light energy to the emulsion to cause polymerization of the monomer into a cross-linked polymer having nanocavities with functional groups covalently-incorporated on walls thereof.

In many implementations, the polymer is hyper cross-linked or a cross-linked polymer network and/or formed of a polymer matrix. The method for making the polymeric material may be for the purpose of selective adsorption of one of carbon dioxide; carbon monoxide; nitric oxide; nitrogen dioxide; hydrogen and sulfur dioxide.

The liquid can be an aqueous solution or an oil. The oil can be a mineral oil. This may be a light or white mineral oil, sometimes termed Paraffinum perliquidum. Some heavy mineral oils (e.g. Paraffinum liquidum) may be suitable. The method may further comprise washing the polymer by one or more of: mechanical agitation and/or ultrasonic agitation and/or soxhlet extraction to remove the liquid.

In some examples, providing thermal energy comprises heating at a temperature of at least a decomposition temperature of the initiator. In some examples, providing light energy comprises irradiating with a UV light of an energy density and wavelength of at least a decomposition energy of the initiator.

In some implementations, the emulsifying can comprise forcing the solution through a porous membrane and forming substantially uniformly-sized droplets by controlling a rate of flow through the membrane and a shear force causing relative movement between the membrane surface and the emulsion. A shear force may be imposed on the membrane surface. The membrane pores may have a diameter of approximately 1-60 microns. Such a membrane may not have a fixed pore spacing or the pores may be spaced within approximately a range of 80-200 microns.

In some examples, the dissolving comprises mixing with a template comprising molecules that are structurally similar to molecules of the gas such that monomer-template complexes are formed. The template molecules may be a structural analogue of one or two or more molecules of the gas. The method may further comprise removing the template, thereby leaving the nanocavities with functional groups having an affinity to target gas molecules. The functional groups may have a high affinity to the target gas molecules, such that they are highly susceptible to physisorbing a target gas molecule.

The solvent can comprise a mixture of an apolar, nonprotic solvent to promote stability of the complex by stabilizing hydrogen bonds between the template and monomer and/or facilitating mesopore formation and a solvent in which the monomer, template, cross-linker and initiator have a solubility which promotes homogeneity of the solution.

In some examples, such as where the liquid is an oil, the solvent can comprise a porogenic solvent in which the monomer, template, cross-linker and initiator have a solubility but which is immiscible with the oil.

In some implementations consistent with the current subject-matter, the method may be for making a polymeric material for selective adsorption of carbon dioxide, wherein the functional group is a carbon-dioxide-philic group which is one of an amide group; an amine group; a carboxyl group;

and a hydroxyl group. An amine may be primary, secondary or tertiary. In some cases, the template can be a low molecular weight carboxylic acid, having a molecular weight of between approximately 46 g/mole and 200 g/mole. In some examples, the template is oxalic acid or formic acid. A distance between carbon-dioxide-philic groups of the monomers in the nanocavities may be within a range suitable for hydrogen bonding to a carbon dioxide molecule.

The solvent may be one or more of toluene, acetonitrile, dimethylsulfoxide, chloroform, water, ethanol and methanol. The monomer may be an amine or an amide, optionally selected from acrylamide, diallylamine, allylamine, methacrylamide, 4-vinylaniline and triallyamine. The cross-linker can be selected from ethylene glycol dimethacrylate and N,N'-methylenebis(acrylamide). The initiator may be selected from 2,2'-azobis(2-methylpropionitrile) (AIBN), ammonium persulfate (APS) and di(4-tert-butylcyclohexyl) peroxydicarbonate (Perkadox 16).

In some implementations where the liquid is an oil, the oil may be further immiscible with the monomer and initiator. In examples where the oil is a mineral oil, it can have a dynamic viscosity of between approximately 10 and 20 mPa·s, more preferably between approximately 14 and 20 mPa·s. Other oils of similar viscosities may also be suitable.

In some examples, the agitating can comprise stirring at a speed of between approximately 100 rpm and 1200 rpm. The agitating may comprise stirring at a speed of either between approximately 600 rpm and 1200 rpm or approximately 300 rpm. Approximately can mean to within around the nearest 10 rpm.

According to another aspect of the present invention, a material may be formed by any of the above-discussed methods in any feasible combination.

According to yet another aspect of the present invention, there is provided a material comprising particles of uniform or substantially uniform sphericity formed from a cross-linked polymer and having nanocavities with functional groups having an affinity for a gas covalently incorporated on the walls of the nanocavities, onto which molecules of the gas can be selectively adsorbed.

In many implementations, the polymer is hyper cross-linked. At least half of the particles by volume may have a diameter of approximately 10 microns to 1000 microns. In some implementations, the median diameter of the particles may be approximately 10 to 1000 microns, preferably approximately 10-160 microns or preferably approximately 40-160 microns or preferably approximately 30-50 microns, or preferably approximately 34-47 microns. In some cases, the span of diameters of the particles is approximately 1.4 or lower. The span may be between approximately 0.3 and 1.3 or preferably less than 1.3, preferably 0.3-0.9, or preferably approximately 0.3-0.8, or preferably approximately 0.6-0.9.

The material may have a Type II or Type IV IUPAC nitrogen adsorption isotherm.

The nanocavities may be smaller than 2 nm, or in some cases smaller than 1 nm, or in some particular cases smaller than 0.7 nm, or between approximately 0.3-1 nm, preferably 0.45-0.7 nm. This may refer to a distance between functional groups on walls of the nanocavities.

The particles may be insoluble in water and can be regenerated by removal of adsorbed gas molecules using temperature and pressure manipulations.

In some implementations, the nanocavities of the material may have been formed by molecular imprinting with a template comprising molecules having structural similarity to molecules of the gas. The template molecules may be a structural analogue of one or more molecules of the gas.

In some implementations, the functional groups of the material are carbon dioxide-philic and the nanocavities can have a greater affinity for carbon dioxide adsorption than other molecules in a mixed gas stream. A mixed gas stream can include some or all of the following gases, which are exemplary only: carbon dioxide, oxygen, steam, $SO_x$, $NO_x$, methane, and hydrogen.

In some examples, the template can be a carboxylic acid, optionally selected from oxalic acid or formic acid. The carbon dioxide-philic groups may be one of an amide and an amine. An amine may be primary, secondary or tertiary. The carbon-dioxide-philic groups may adsorb a carbon dioxide molecule by a noncovalent bond.

In some implementations, the nanocavities are sized for adsorption of one or two or more carbon dioxide molecules. A distance between carbon-dioxide-philic groups in the nanocavities may be within a range suitable for hydrogen bonding to a carbon dioxide molecule.

The material may be formed by polymerization of an amide or amine monomer, optionally selected from acrylamide, diallylamine, allylamine, methacrylaminde, 4-vinylaniline and triallyamine.

In another aspect, the invention relates to a method of adsorbing a selected gas from a gas stream comprising a mixture of gases, comprising flowing the gas stream past any of the materials described above, which may have any features in any feasible combination of those described above.

In implementing such a method, the material may be in a fixed bed, a moving bed, or a fluidized bed. The gas stream can comprise a mixture of one or more of the following gases: carbon dioxide, oxygen, steam, $SO_x$, $NO_x$, methane, and hydrogen. At least some of the materials described above are such that they can adsorb a selected gas when the gas stream is at a temperature of approximately −30-80° C. In some particular implementations, the temperature may be approximately −30-60° C. or −30-40° C. or −20-80° C. or −0-80° C. or 0-60° C. or any other range within −30-80° C.

In some examples, the selected gas is carbon dioxide.

In a further aspect, the invention relates to an apparatus for producing any of the above-discussed materials. The apparatus may comprise an emulsification apparatus for emulsifying a dispersed phase comprising a monomer in a solvent; and a reactor in which the emulsion can be held, the reactor being arranged to cause polymerization of the monomer.

In some implementations, the emulsification apparatus may comprise a porous membrane, a pump arranged for pumping the dispersed phase through the membrane, and a droplet forming mechanism arranged to act on the membrane to create substantially spherical droplets of dispersed phase. The droplet forming mechanism may be a droplet break-up mechanism. In some examples, the membrane may have an emulsion-facing surface and the shear forming mechanism may be arranged to cause relative movement between the membrane surface and the emulsion.

DRAWINGS

The present invention will now be described by way of example with reference to the accompanying drawings, in which.

Figure 17:
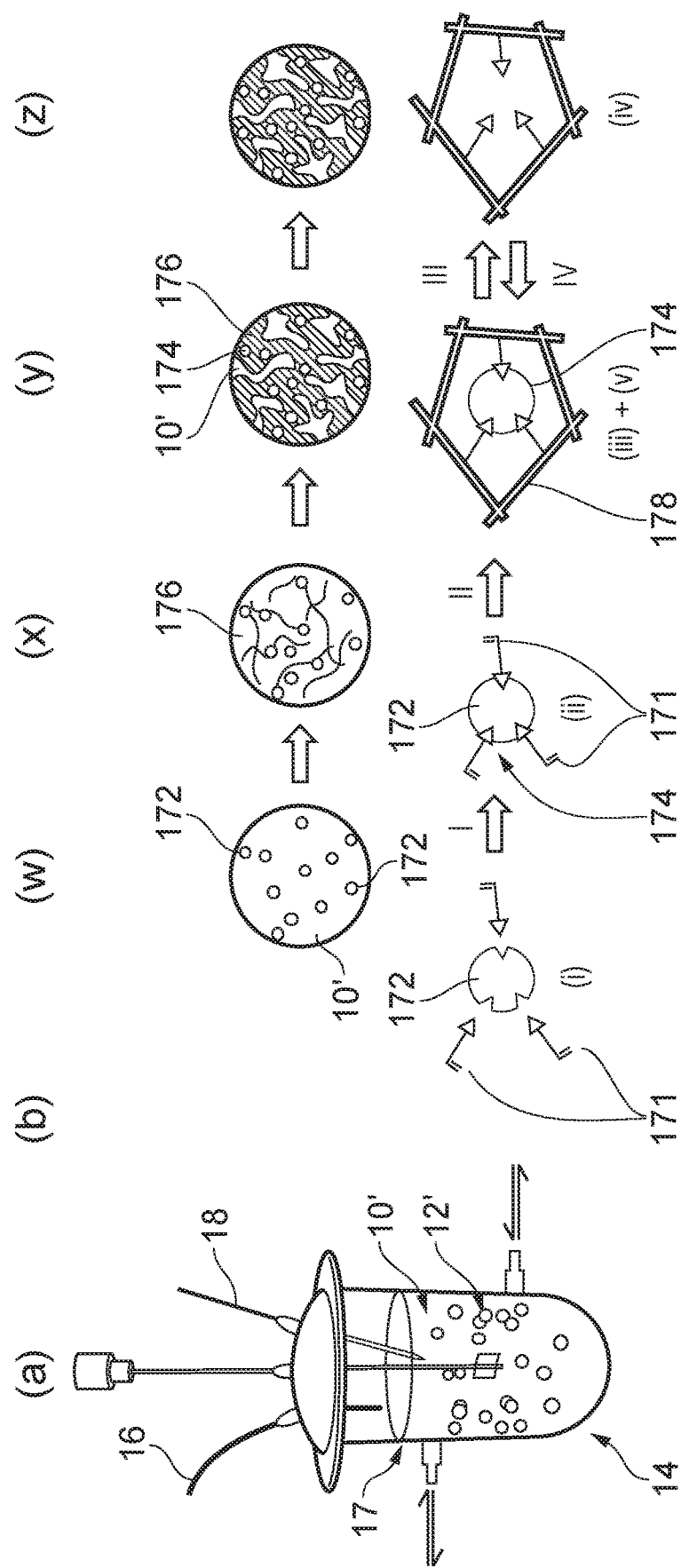
FIG. 17(a) shows a jacketed reactor for suspension polymerisation for making a different polymeric material.
FIG. 17(b) shows schematically a process for forming the polymeric material and its use in capturing a gas.
Figure 19:
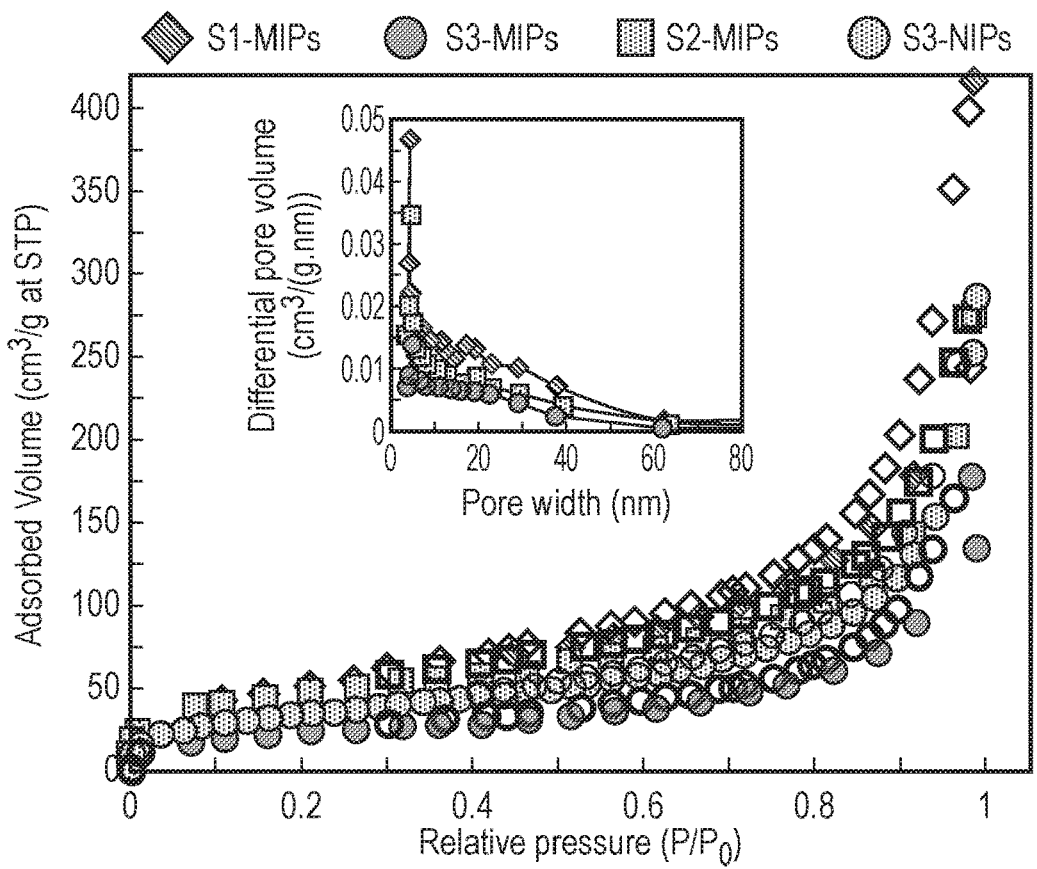
Figure 20:
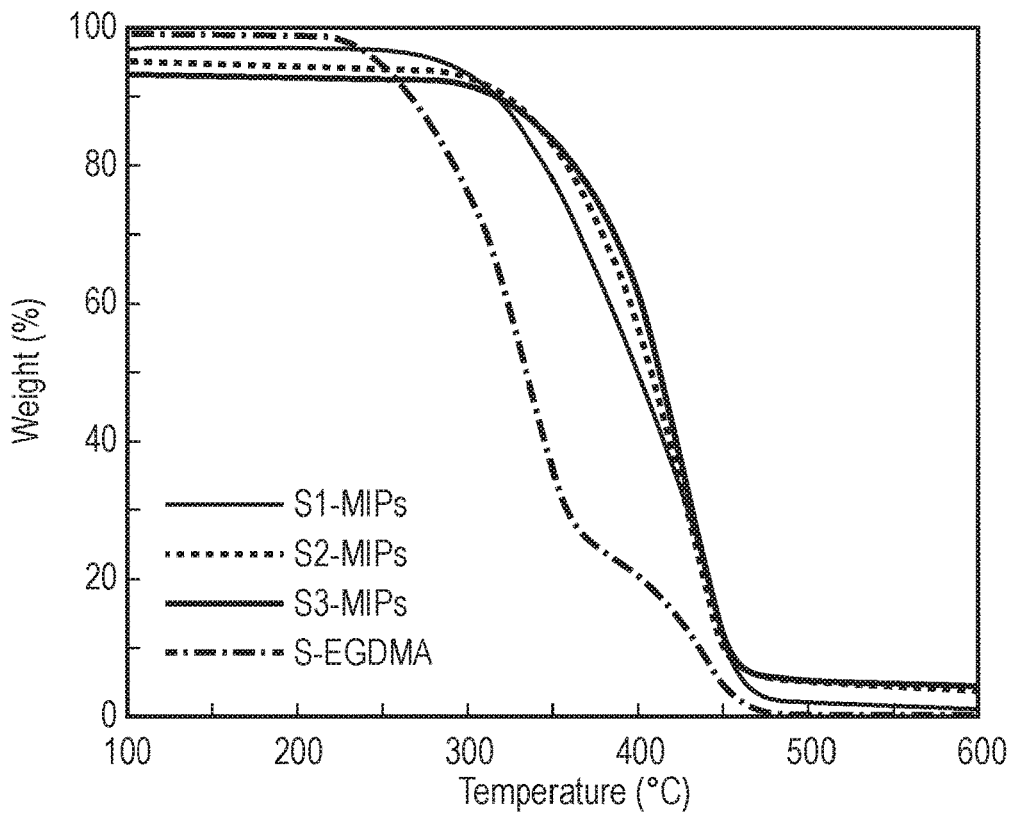
Figure 21:
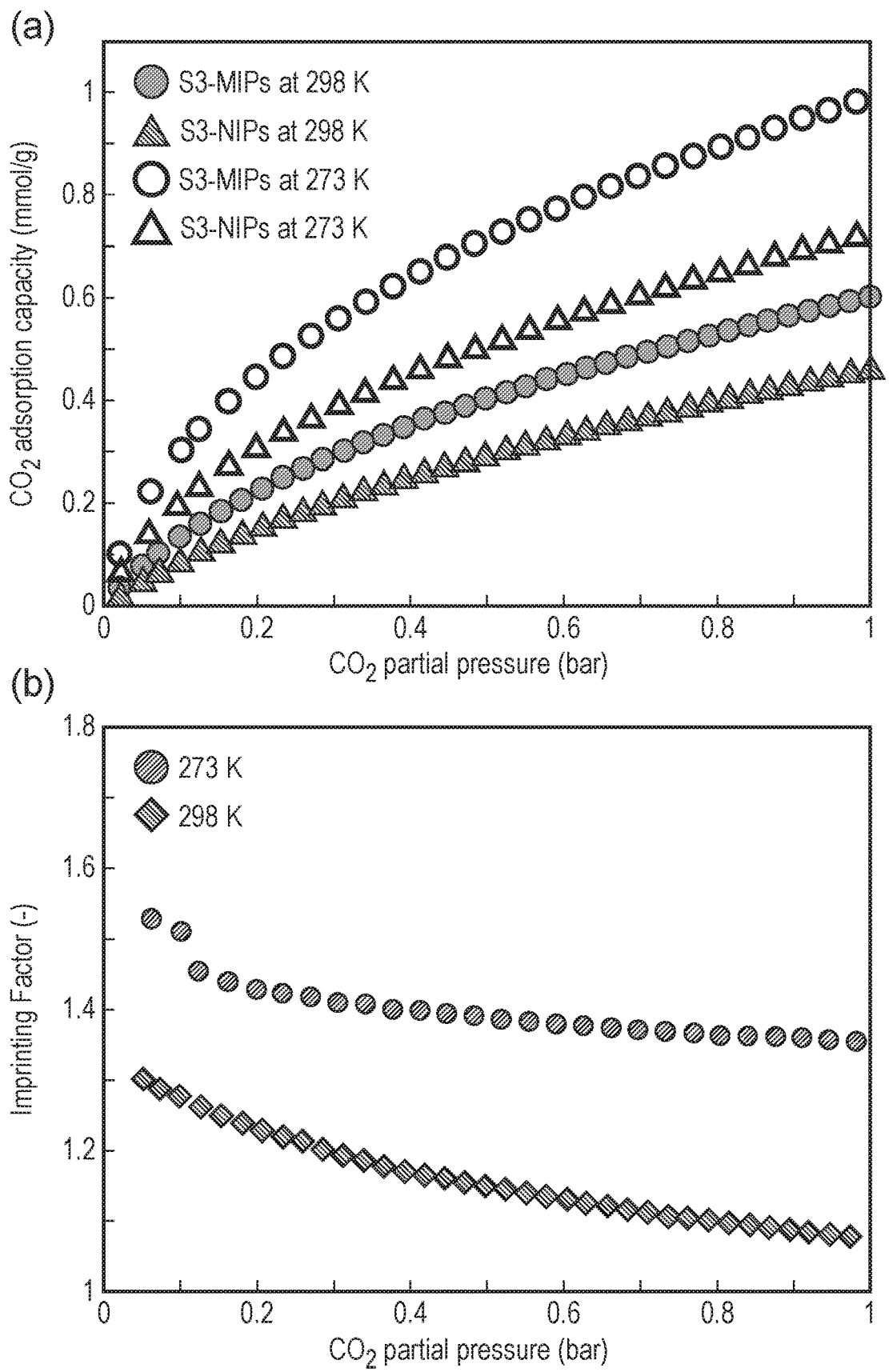
Figure 22:
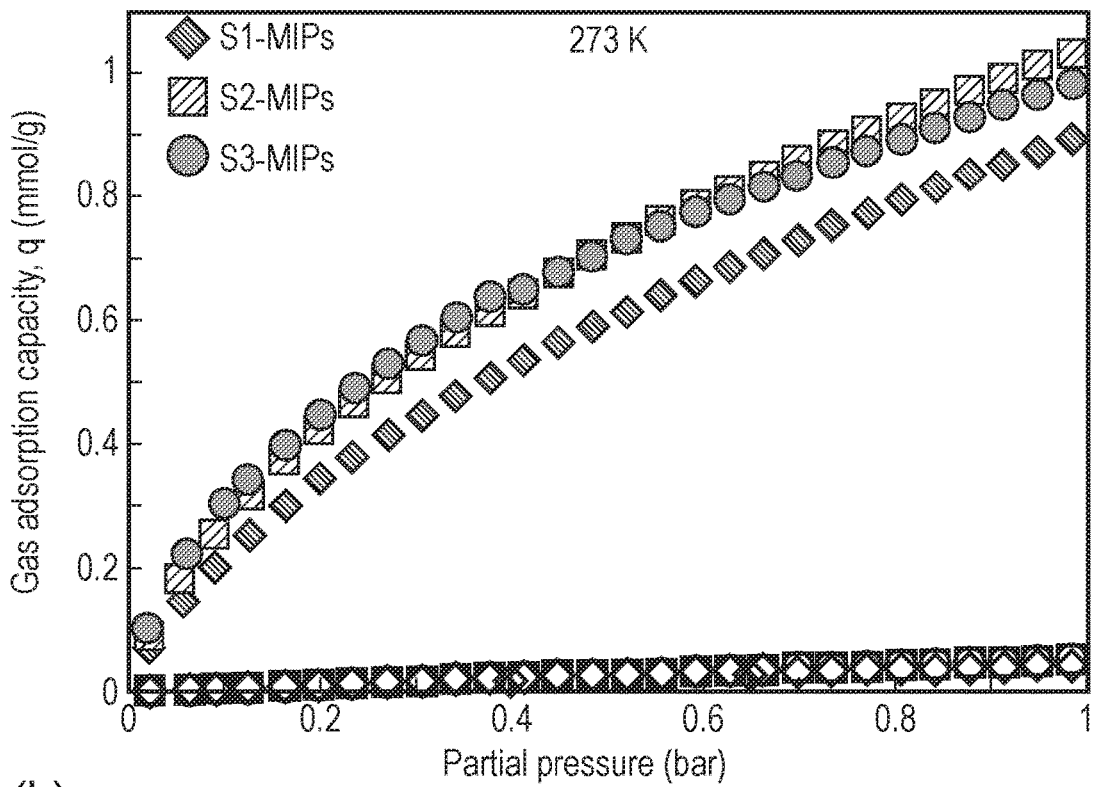
Figure 22:
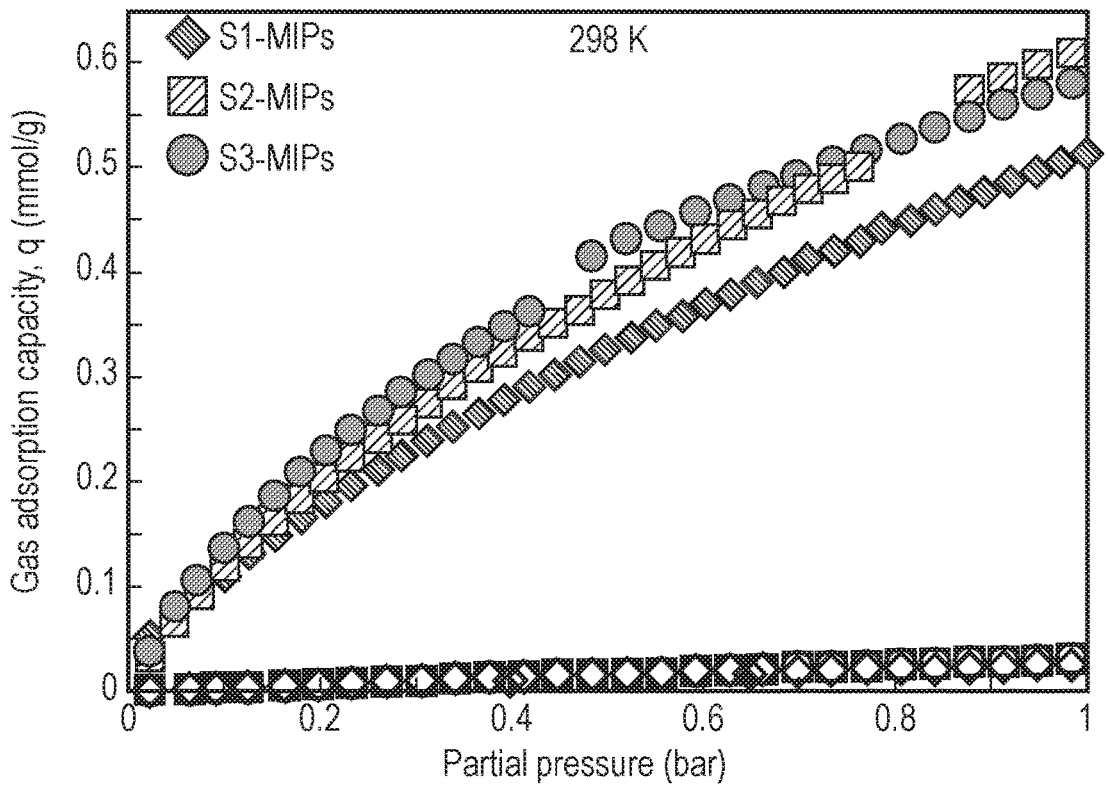
Figure 22:
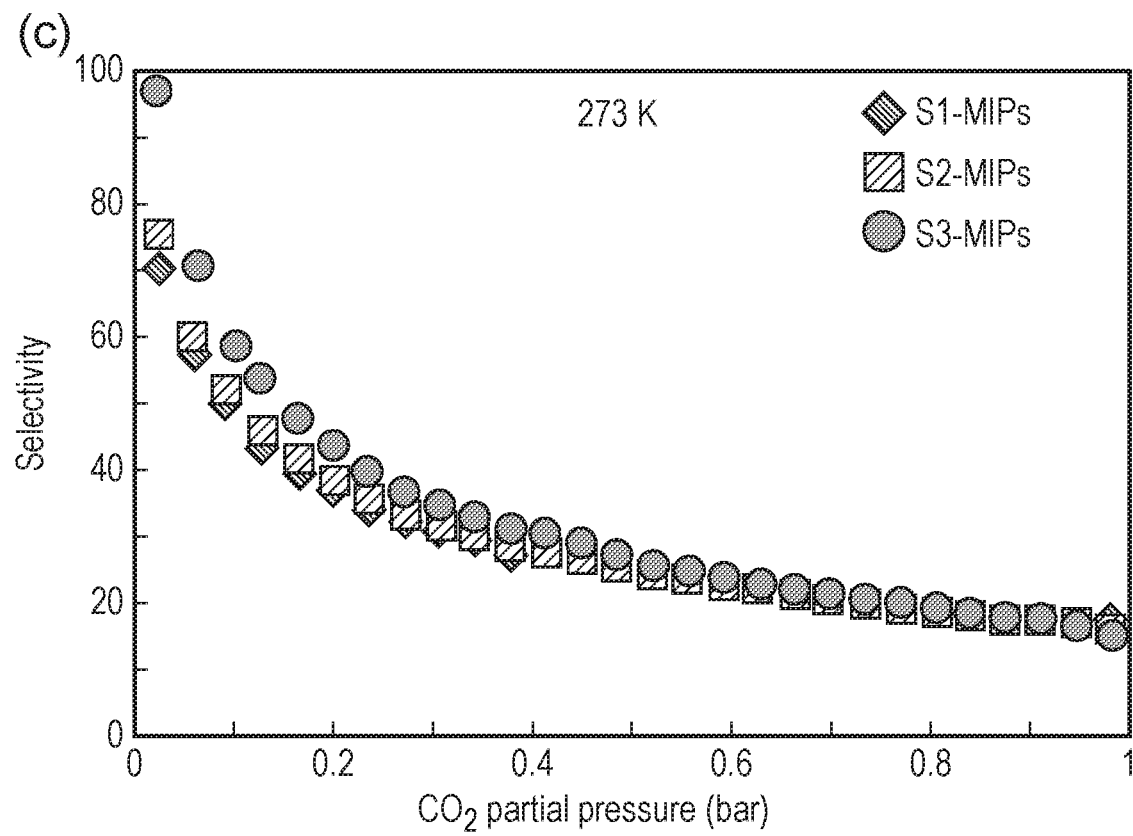
Figure 22:
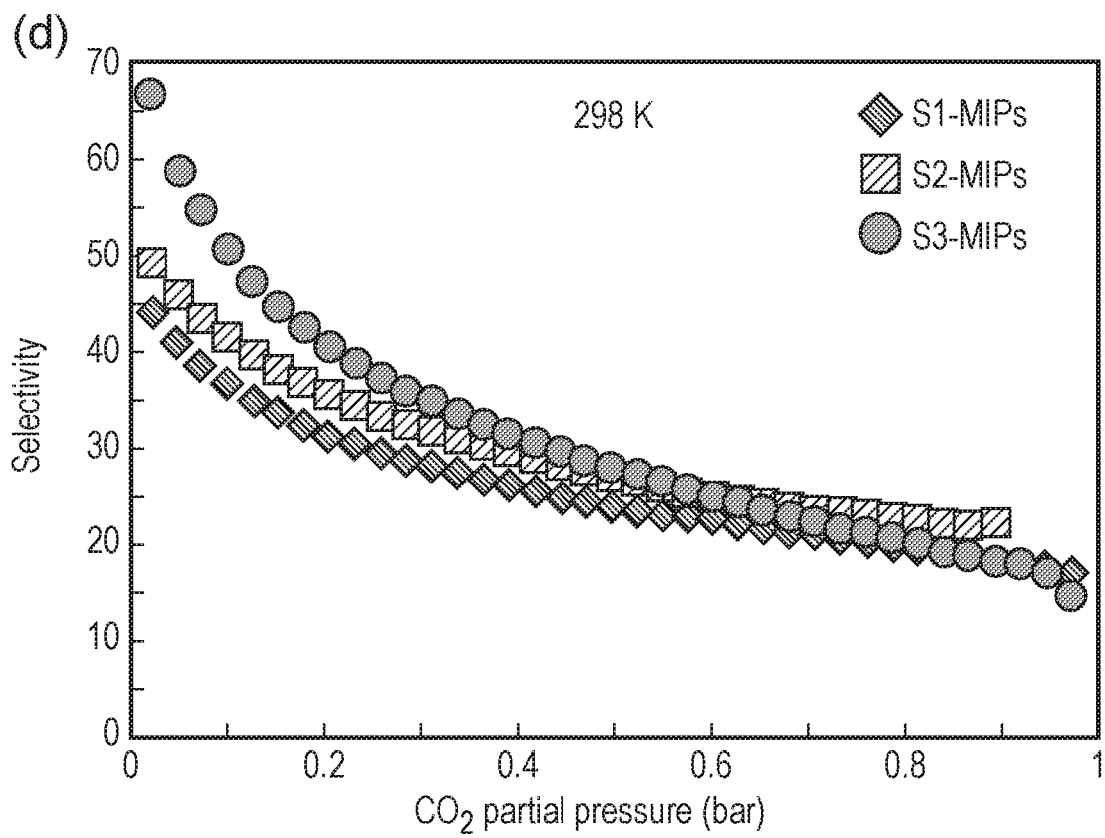
Figure 23:
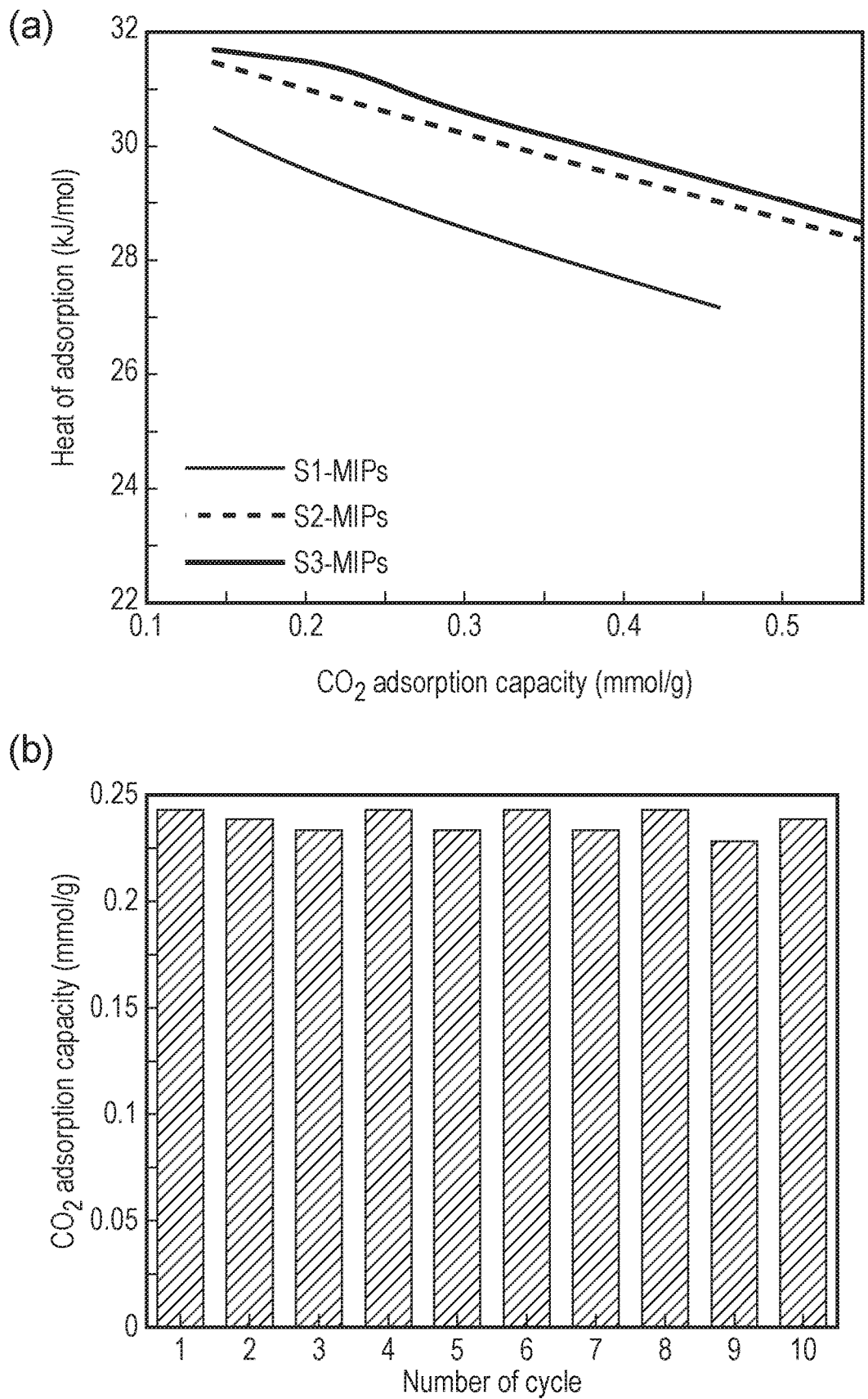

FIG. 18(a)-(d) show SEM images of the polymeric material of FIG. 17; and FIG. 18(e) shows an SEM image of a droplet that may be present in the polymeric material;

FIG. 19 shows Nitrogen adsorption-desorption isotherms of prepared samples;

FIG. 20 shows thermogravimetric analysis (TGA) of prepared samples;

FIG. 21 compares carbon dioxide adsorption isotherms of prepared samples;

FIG. 22 shows carbon dioxide and nitrogen adsorption isotherms of prepared samples; and FIG. 23 shows heat of adsorption and carbon dioxide adsorption capacity of prepared samples.

In the figures, like reference numerals indicate like parts.

DETAILED DESCRIPTION

The current subject-matter relates to polymeric materials for use in capturing a gas. In some implementations, the materials described are selective for a particular gas such as $CO_2$. The materials can be formed of particles which are relatively uniform in size and have good sphericity or are irregular-shaped but rounded. Examples discussed herein include molecularly imprinted cross-linked or matrixed polymers formed by suspension polymerization of a monomer selected as having a group which displays affinity for a selected gas such as $CO_2$. In some implementations, a dummy template is used to assist in formation of nanocavities in the resulting polymer, which have functional groupings incorporated on their walls which can allow selective adsorption of a chosen gas such as $CO_2$. The materials described herein are mesoporous and/or macroporous, the mesopores/macropores allowing gas to flow through the particle structure and thus obtain access to the nanocavities.

A number of polymerization techniques are known in the art, many of which could be used in implementations of the current subject-matter. However, some of these may have drawbacks for production of a practically-useful adsorbent, such as those discussed above with respect to the technique of bulk polymerization. The present applicant has devised methods which incorporate steps that can result in an improved polymeric structure over those made by known techniques. Particles as described above, which the present applicant has prepared using a suspension polymerization technique, can be highly spherical, or, in some examples, irregular shapes but with rounded corners and/or edges.

In some examples discussed herein, uniformity of the particles is further improved by including a membrane emulsification technique in the forming process. In some examples, size can be controlled using such a membrane. In some examples, size can additionally or alternatively be controlled by choice of production materials and/or stirring speed.

The polymeric material resulting from the above process is formed of beads or particles, which can be suitably-sized for use in fixed, moving or fluidized beds. The particle size and shape is dependent, among other factors, on that of emulsion droplets of a monomer prior to polymerization and thus can be spherical or near-spherical or irregular rounded.

When selecting an adsorbent for low-temperature post-combustion capture, it is often desirable to aim for a balance between a number of criteria. These include: (1) low heat (enthalpy) of adsorption; (2) high working capacity; (3) high target gas selectivity; (4) high hydrochemical and thermal stability (low degradation rate); (5) high recyclability; (6) production scalability; (7) optimum morphology; (8) low cost; and (9) low toxicity. Adsorbents can be classified into physisorption- or chemisorption-based materials, according to their target gas uptake mechanisms. In the chemisorption process such as the amine-based process described previously, the adsorbates and adsorbents make covalent bonds and the heat of adsorption is larger than 40 kJ mol. Physisorptive adsorbents such as the previously-described zeolites, on the other hand, do not form chemical bonds with the target gas, but rather adsorb by electrical interactions, thus resulting in a heat of adsorption below 40 kJ mol$^{-1}$. Thus, they incur lower energy penalties (per criterion (1)) and can be considered as a promising alternative to chemisorption processes if they also achieve a good balance among the remaining aforementioned criteria. However, zeolites present less well for some of the other criteria, in particular (2), (3) and (5). As well as being strong on criterion (1), implementations of the current subject-matter described herein can provide an improved balance over others of the criteria.

Materials for Production

Table 1 shows a number of combinations of possible substances for each of the various formulations that can be used in production of the inventive material that have been investigated by the present applicant for selective adsorption of a gas, by way of example $CO_2$.

Some considerations for selection of substances are discussed in the following:

Monomer

Suitable classes of monomers can include monomers having amide or amine groups. The amine groups may be primary, secondary or tertiary. Other suitable classes of monomer include those having carboxyl or hydroxyl groups. These functional groups can result in a higher affinity towards $CO_2$ than other gases which may be found in gas streams, such as flue gases. This is due to their polarity and resultant quadrupole moment which can attract $CO_2$ molecules. Such attraction can result in a noncovalent bond such as an ionic bond or a hydrogen bond or a Van der Waals bond with a carbon dioxide molecule.

Suitable monomers include acrylamide (AAm), allylamine, diallylamine, methacrylamide, 4-vinylaniline and triallyamine.

Template

A "dummy" template can be mixed with the monomer, which enables the creation of suitably-sized nanocavities in the resulting polymeric material, onto which $CO_2$ molecules can be adsorbed. Generally speaking, the template is chosen as being a structural analog to a $CO_2$ molecule or, in some implementations, multiple $CO_2$ molecules. Suitable templates include low molecular weight carboxylic acids, for example having a molar mass of between approximately 40 g/mole and 200 g/mole or between approximately 46 g/mole and 200 g/mole or between approximately 46 g/mole and 130 g/mole. The stated exemplary molecular weights may be approximate to 1 decimal place or two decimal places.

Suitable templates include formic acid and oxalic acid. For example, oxalic acid has a spatial structure very similar to two $CO_2$ molecules with their C atoms sitting back-to-back and O atoms pointing in opposite directions.

Solvent

A solvent is chosen to be miscible with monomer, template, cross-linker and initiator. One class of solvents that can be used are oil-based solvents which have low polarity and may be porogenic. Suitable solvents include acetonitrile (AN) and toluene (TL).

Another class of solvents that can be used are aqueous solvents. Such a solvent may be highly polar. Suitable solvents include water, or a mixture of water, dimethylsulfoxide (DMSO), ethanol, and/or methanol.

It should be noted that it may be advantageous to use a mixture of solvents for the dispersed phase. For example, one solvent could be chosen to favour template-monomer interactions and the stability of the complex and thus promote stability of hydrogen bonds between the monomer and the template and facilitate nanocavity formation. Another solvent could be additionally used that can promote solubility of the monomer, template, initiator and cross-linker, and thus homogeneity of the dispersed phase. An absence of the latter type of solvent can cause early phase separation between the polymer and the solvents, which results in aggregation of copolymer nuclei into larger clusters, which can undesirably increase the pore size and pore volume.

In some implementations, ethylene glycol dimethacrylate can be used as the cross-linker and azobisisobutyronitrile or perkadox 16 can be used as the initiator. In this instance, a less polar porogenic solvent such as toluene, acetonitrile (AN), dimethylsulfoxide (DMSO), chloroform, dichloromethane or a mixture of them may be preferable.

In implementations where N,N-methylenebisacrylamide (N,N) is used as the cross-linker with ammonium persulfate as the initiator, water, or a mixture of water, DMSO, ethanol, and methanol may be preferable.

In some "oil-in-oil" emulsification implementations, where both the solvent and the continuous phase are oil-based rather than aqueous, porogenic solvents such as toluene, chloroform or dichloromethane, may be miscible with the continuous phase and therefore not suitable. An alternative porogenic solvent such as AN can be chosen in this circumstance.

In preparations of non-imprinted polymers for comparative testing, due to the absence of monomer-template interaction, both high polar solvents, such as water, ethanol and methanol, along with a less polar solvent or a mixture of them may be suitable.

Cross-Linker and Initiator

A cross-linker and initiator are selected to be soluble in the solvent/monomer system. Suitable cross-linkers include ethylene glycol dimethacrylate and N,N'-methylenebis(acrylamide). Suitable initiators include 2,2'-azobis(2-methylpropionitrile) (AIBN), ammonium persulfate (APS) and di(4-tert-butylcyclohexyl) peroxydicarbonate (Perkadox 16).

Dispersed Phase

A monomer, cross-linker and initiator are dissolved in the solvent and the resulting solution is called a "dispersed phase".

Continuous Phase

In order to prepare an emulsion, the dispersed phase is added into a liquid, known as the continuous phase. The liquid should be one with which the dispersed phase is immiscible, so that an emulsion of the two can form. If the continuous phase is an aqueous phase it usually contains a hydrophilic stabilizer or surfactant such as polyvinyl alcohol (PVA). Such a stabilizer can provide a low interfacial tension between the two immiscible phases, thereby preventing or reducing droplet coalescence. This approach has been taken with some examples described herein.

A known issue with oil-in-water suspension polymerization techniques, which use an aqueous solvent as the continuous phase, is a loss of hydrophilic monomers to the solvent due to dissolving. The present applicant has addressed this issue in some implementations of the current subject-matter by use of an oil, such as a mineral oil, as the continuous phase instead of an aqueous phase. As hydrophilic monomers are insoluble in a mineral oil, monomer loss can be prevented in this way. Moreover, subsequent washing of the polymeric particles is simplified as there is no stabilizer to be removed.

In oil-in-oil implementations, various oils may be suitable. One option is a mineral oil, especially a light mineral oil or white mineral oil, sometimes termed Paraffinum perliquidum. which has advantages such as being widely available in large volumes at low cost, as well as possessing low flammability and low toxicity. Such mineral oil may be a petroleum distillate, for example of higher alkanes, and may alternatively be known as paraffin oil. Some heavy mineral oils (e.g. Paraffinum liquidum) may be suitable. One consideration when selecting a suitable oil is its dynamic viscosity. This may be relatively low, for example in the range of approximately 10-20 mPa·s or more preferably approximately 14-20 mPa·s, where approximately can, for example, include +/−1 mPa·s, so as to enable stirring during the polymerization process. Another consideration is that it should ideally be immiscible with the solvent and also with the cross-linker and initiator.

Method

Figure 1:
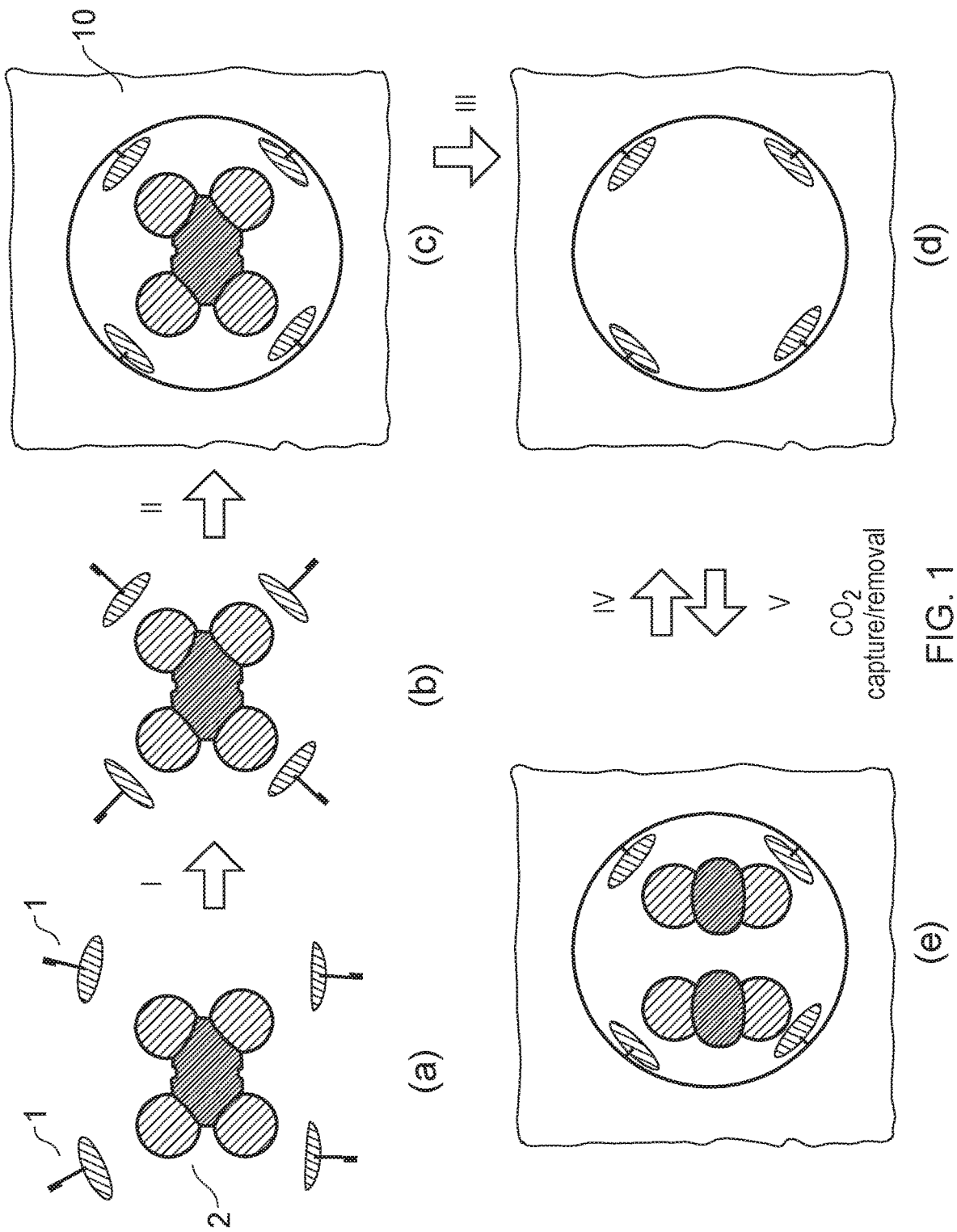
FIG. 1 shows schematically a process for forming a polymeric material and its use in capturing a gas.

FIG. 1 shows a schematic overview of the principle stages of a production process of the polymeric material and its subsequent use to adsorb gas molecules. Diagram (a) shows, by way of example only, four monomer molecules 1 and a template molecule 2. As an example, the template molecule 2 resembles two $CO_2$ molecules and may be, as discussed above, oxalic acid. A monomer-template self-assembly occurs (I), resulting in diagram (b) in which each monomer molecule 1 is bonded to an atom of the template molecule by a molecular interaction which depends on the particular substances being used. In many cases, the distance between monomer molecules in the structure such as that of diagram (b) matches or substantially matches that which can subsequently allow hydrogen bonding with a $CO_2$ molecule.

A next stage (II) is polymerization of the monomer. FIG. 1 diagram (c) shows schematically a resulting polymer structure 10, in which the four monomer molecules have polymerized, such that the template molecule sits between them. It will be understood that in practice, the resulting polymer structure of a particle is far more complex, being cross-linked, in many cases hyper cross-linked or matrixed.

A next stage (III) is removal of the template. FIG. 1 (d) shows schematically a resulting structure in which the template present in diagram (c) has been removed, leaving a cross-linked polymeric structure based on the monomers 1. In this structure, the functional group(s) of the monomer, which was chosen for affinity with a selected gas such as carbon dioxide, are covalently-incorporated on walls of nanocavities. In this example, the nanocavities present between the monomers are sized to correspond to two carbon dioxide molecules. As previously mentioned, the polymeric structure will also comprise mesopores and/or macropores. These two types of cavity are distinguished by their size, mesopores having a diameter of 2-50 nm, macropores having a diameter of more than 50 nm. It will be appreciated that in comparative examples in which no template was used, a material structure will result without removal of the template, but the monomer groups will not be incorporated in nanocavities.

Polymeric materials made in accordance with implementations of the current subject-matter can be used for capture of a selected gas, such as carbon dioxide, from a flowing gas stream. Stage IV of FIG. 1 shows a reversible capture and release of gas molecules, in this example two carbon dioxide molecules. FIG. 1(e) shows two carbon dioxide molecules, each held between two functional groups, such that they are adsorbed onto the polymeric structure of diagram (d). They can be held by a mixture of non-covalent bonds, including ionic bonds, hydrogen bonds and Van Der Waals forces. Stage IV is indicated as reversible, because at a later stage, for example when the polymeric material is saturated with $CO_2$, the $CO_2$ molecules can be removed by regenerating the polymeric material.

The various stages of exemplary production processes will be described in more detail in the following.

Monomer-Template Self-Assembly in Dispersed Phase

It is possible to covalently link a template to a monomer, but many examples herein use an alternative method of template-monomer self-assembly to attach the template to the monomer (FIG. 1, stage I). The monomer and template are dissolved in the solvent (which may be more than one solvent, as discussed above). The mixture may be stirred, for example for two hours. The cross-linker and initiator can then be added. Monomer-template self-assembly may take up to a few hours and the mixture may be left overnight to facilitate completion of the self-assembly process.

In the production of comparative examples, such as some examples discussed later, where no template is used, the self-assembly step is not required. Instead, the monomer, cross-linker and initiator are dissolved in the solvent.

Emulsification

Emulsification involves dispersing the dispersed phase liquid in the continuous phase in the form of fine droplets. The applicant presents three possibilities:

a) An oil-based dispersed phase prepared using an organic solvent, together with an aqueous continuous phase prepared using water and/or an aqueous solvent ("oil-in-water")

b) An oil-based dispersed phase prepared using an organic solvent, together with an oil-based continuous phase prepared using a mineral oil or other convenient oil ("oil-in-oil")

c) A water-based dispersed phase prepared using water and/or an aqeuous solvent, together with an oil-based continuous phase prepared using a mineral oil ("water-in-oil")

In some examples the dispersed phase can be mixed together with the continuous phase and emulsified by stirring. This can be done by pouring the mixture into the same reactor to be used for subsequent polymerization. The stirring can be done using an impeller.

In some traditional "top-down" emulsification methods, e.g. mixing in a stirred tank per the examples discussed in the previous paragraph, a result can be highly polydispersed droplets whose size cannot easily be controlled. Thus, whilst not essential, in some implementations discussed herein, membrane emulsification is included as part of some methods for forming polymeric materials. Membrane emulsification is a "bottom-up" approach based on injection of one liquid through a microporous membrane into another liquid phase in which the first liquid is immiscible. Continuous membrane emulsification systems enable large-scale production and can involve oscillatory (pulsed) flow of the dispersed phase through a stationary membrane or continuous injection of the dispersed phase through a non-stationary membrane, such as a rotating or vibrating membrane. Examples of the latter technique are discussed below.

Thus in some implementations, control of particle size and shape can be improved by using a membrane emulsification technique. This can be a "direct membrane emulsification" or a "premix membrane emulsification". In direct membrane emulsification the dispersed phase is injected through the membrane into the continuous phase, while, in premix membrane emulsification, the dispersed phase is firstly coarsely emulsified in the continuous phase and the coarse emulsion is passed through the membrane.

Figure 2:
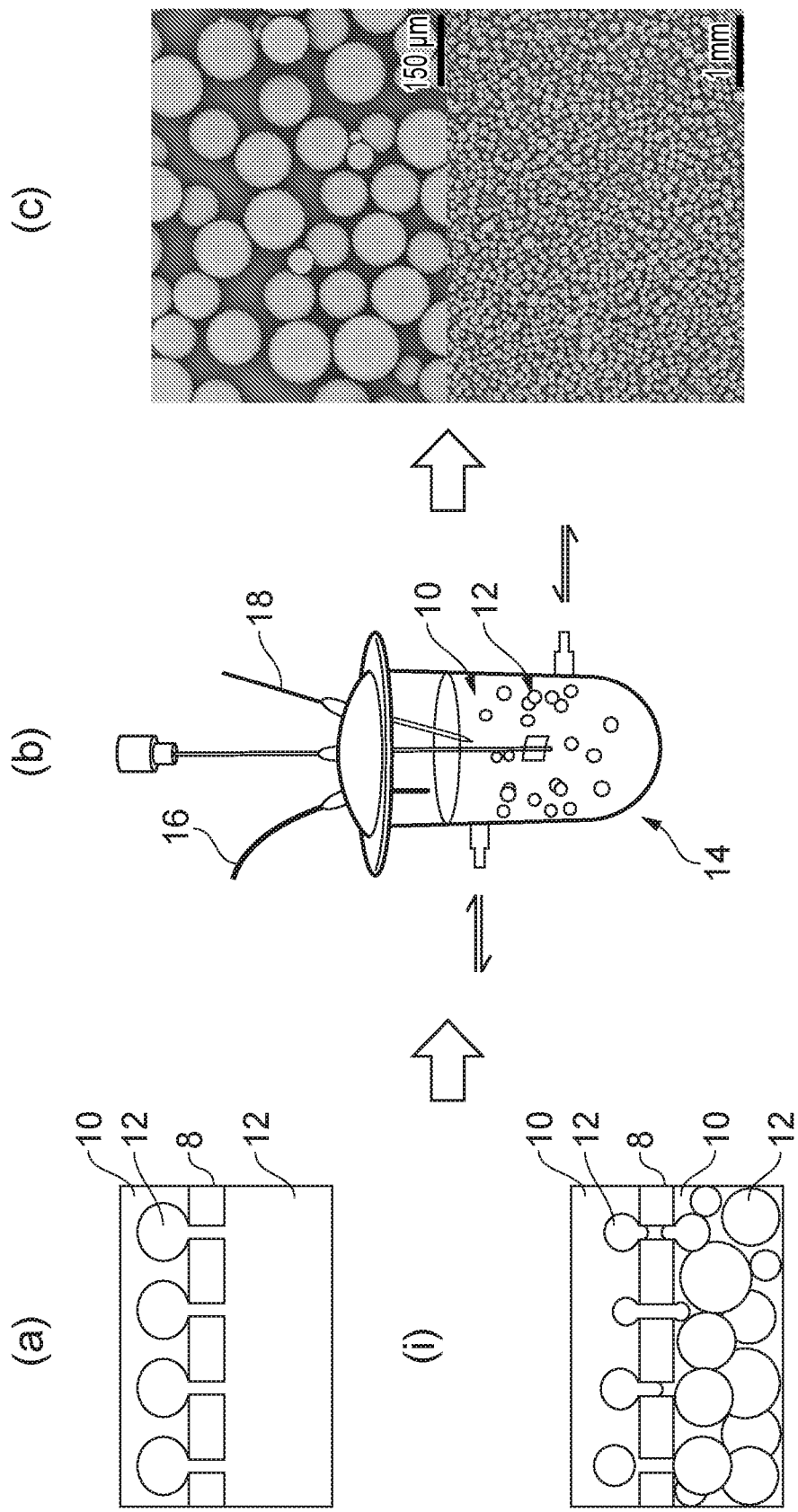
FIG. 2(a) shows schematically two alternative membrane emulsification techniques.
FIG. 2(b) shows a jacketed reactor for suspension polymerisation for making a polymeric material.
FIG. 2(c) shows SEM images of polymeric materials.

FIG. 2 shows schematically an overview of some main steps of the process for polymeric particle preparation described herein from emulsification, through suspension polymerization to produced spherical polymeric particles. FIG. 2(a) shows schematically two possible membrane emulsification techniques discussed above. Other apparatus arrangements and techniques for implementing membrane emulsification will occur to those skilled in the art.

FIG. 2(a)(i) shows direct membrane emulsification, in which a dispersed phase 12 is present as a bulk liquid on an upstream side of a membrane 8. The membrane 8 contains pores through which the dispersed phase can be forced into a continuous phase 10. In this example, the dispersed phase can be pumped continuously through the membrane 8, or alternatively in batches. As the dispersed phase emerges from the other side of the membrane 8, a shear force created on the membrane surface causes a break-up of the dispersed phase in the form of droplets 12 suspended in the continuous phase. This could be done by means of a paddle stirrer or a perforated rotating disc. In other words, a shear forming creates a relative movement between the membrane surface and the continuous phase.

FIG. 2(a) (ii) shows premix membrane emulsification. On an upstream side of the membrane 8, a coarse emulsion of the dispersed phase 12 in the continuous phase 10 is present. The droplets of dispersed phase in this coarse emulsion may be of varying sizes. On a downstream side of the membrane 8, droplets of the dispersed phase 12 are shown forming, having been forced through the membrane pores. The continuous phase 10 is present on the downstream side of the membrane 8, such that the formed droplets can be sheared off the membrane 8 and thereby become suspended in the continuous phase. This process can improve the uniformity of particle size over that of the coarse emulsion.

Using techniques such as those described above, spherical or near-spherical droplets can be created. They may be highly spherical.

However, the present applicant has discovered that control of particle size and shape can additionally or alternatively be improved by choice of production materials and stirring speed. For example, some oil-in-oil emulsifications can allow particle size to be controlled by varying the speed of stirring in order to allow production of a range of particle sizes. This may be advantageous because the operation of different types of beds used to adsorb a target gas may be optimized in dependence on particle size.

Suspension Polymerization

FIG. 2(b) shows a jacketed reactor 14. As explained above, an emulsion of the dispersed phase in the continuous phase may have been prepared in situ. Otherwise, if a membrane emulsification technique has been used, the suspension can be poured into the jacketed reactor 14.

The reactor can be purged with nitrogen, for e.g. 10 minutes, to remove oxygen and thus prevent oxygen from diffusing into the reactor (nitrogen blanketing). A nitrogen feed 16 is indicated for this purpose. The purpose of such nitrogen blanketing is in view of the fact that the initiator decomposes to free radicals in order to trigger the polymerization process. Oxygen could react with at least some of these free radicals and hence could hamper their function in the process.

In order to commence the suspension polymerization process, the temperature of the reactor 14 can be raised using a water-recirculating heater/chiller system. A thermocouple 18 can be provided to monitor and control the temperature. The suspension is mechanically agitated and heated as necessary to cause polymerization. The temperature is raised to at least a decomposition temperature of the initiator, such that the free-radical, thermal polymerization process can occur. In some implementations, energy could be provided additionally or alternatively by means of providing light energy. This could take the form of UV light radiation. The UV light could be arranged to provide an energy density and wavelength of at least a decomposition energy of the initiator. Thus free-radical photopolymerization could occur.

To achieve a sufficient decomposition rate of an initiator such as AIBN for example, the polymerization temperature for thermal polymerization is usually at least 50° C. At the start of the polymerization process, individual polymer particles (nuclei) grow separately inside the dispersed phase droplets. These nuclei eventually agglomerate via inter-nuclei crosslinking and the final porous bead or particle is formed. In some cases, the higher the polymerization temperature, the higher the polymerization rate and the larger the number of nuclei formed. The size of individual polymer particles in the bead can decrease with an increasing number of nuclei, which should result in a higher surface area of the beads. However, higher temperatures can weaken monomer-template interactions and reduce the quality of active sites in the polymer network. The present applicant has found that a polymerization temperature of 60-70° C. may be optimum in some implementations, such as examples which use AIBN as initiator.

An advantage of using a suspension polymerization technique is that each individual monomer droplet represents a miniature batch reactor, which can lead to higher rates of heat transfer and shorter polymerization times compared with bulk polymerization for example. Thus the method can be more efficient in terms of energy required and time taken. Polymerization can take, for example, only three hours, which is much less time than previously-used bulk polymerization. Furthermore, unlike with the bulk polymerization techniques previously used for $CO_2$ capture materials, crushing and grinding steps are not involved, and thus higher particle yields can be achieved because wastage of unsuitably-sized particles can be minimized or avoided. The synthesized particles provided can be substantially regular spheres, or irregular but rounded, due to the spherical shape of the monomer droplets, especially if they are created using a membrane emulsification technique.

The applicant has additionally invented techniques and production materials which cause further transformation of the spherical monomer droplets. Such techniques have been particularly developed with an oil-in-oil emulsion system. An example of such a technique can be explained with reference to FIG. 17.

FIG. 17(a) shows a schematic of a jacketed reactor 14 that is similar to the jacketed reactor of FIG. 2(b). Nitrogen blanketing is specifically indicated at 17. In this case, the liquid continuous phase 10' is a mineral oil and the dispersed phase includes a suitable combination of monomer, cross-linker, initiator and solvent for an oil-in-oil emulsion process.

FIG. 17(b) shows a schematic overview of the principle stages of a production process of polymer particles. It is somewhat similar to the process shown in FIG. 1 but may be particularly suitable for an oil-in-oil emulsion technique. A top row of diagrams, (w)-(z), shows schematically how the process proceeds at a reactor level. A bottom row of diagrams (i)-(iv) shows schematically how the process proceeds at a molecular level and is the series of diagrams that is equivalent to FIG. 1.

Diagram (w) indicates the mixture as poured into the batch reactor 14, including monomer, porogen (i.e. a suitable solvent 10' as previously discussed), cross-linker and initiator, as well as template molecules 172. Diagram (i) shows, by way of example only, three monomer molecules 171 and a template molecule 172.

In stage I, a monomer-template self-assembly occurs, resulting in diagram (ii) in which the three monomer molecules 171 are bonded to an atom of the template molecule 172 by a molecular interaction such as hydrogen bonding, which depends on the particular substances being used. This arrangement can be termed a pre-polymerisation monomer-template complex 174.

In stage II, co-polymerisation of the monomer 171 with the cross-linker occurs. This initially results in diagram (x), which depicts a polymer matrix 176 mixed with the continuous phase 10'. Then, in line with a previously-discussed advantage of the oil-in-oil technique, because the monomer tends not to diffuse into the continuous phase, phase separation occurs, in which the polymer matrix can separate from the continuous phase. Thus the structure resembles diagram (y), in which the non-hatched area indicates continuous phase 10' and the hatched area indicates the polymer matrix 176 including the assembled monomer-template complexes 174. Diagram (iii) shows schematically a resulting polymer structure 178, including an assembled monomer-template complex 174. Only one monomer-template complex 174 is shown for clarity, but in practice a polymer particle 178 will be formed of multiple such complexes, as discussed in more detail below.

It will be observed that the schematically-indicated polymer particle 178 is not spherical but rather, polygonal. This is because in the implementation of FIG. 17, the spherical monomer droplets (which can in fact be formed of a mixture of the monomer, solvent, cross-linker and initiator) tend to partially coalesce to form clusters of droplets. In other words, the droplets tend to group together in a partially-fused cluster. Thus some of the droplets will form clusters such as that shown in FIG. 18(*e*). This figure shows an image (obtained as a light intensity image by confocal laser scanning microscopy (CLSM)—discussed in more detail below) of an experimentally-obtained molecularly-imprinted cluster structure formed from two partially-coalesced droplets. In other words, this is a complex particle with an irregular shape formed from a droplet doublet. The scale bar is 100 µm.

Figure 18:
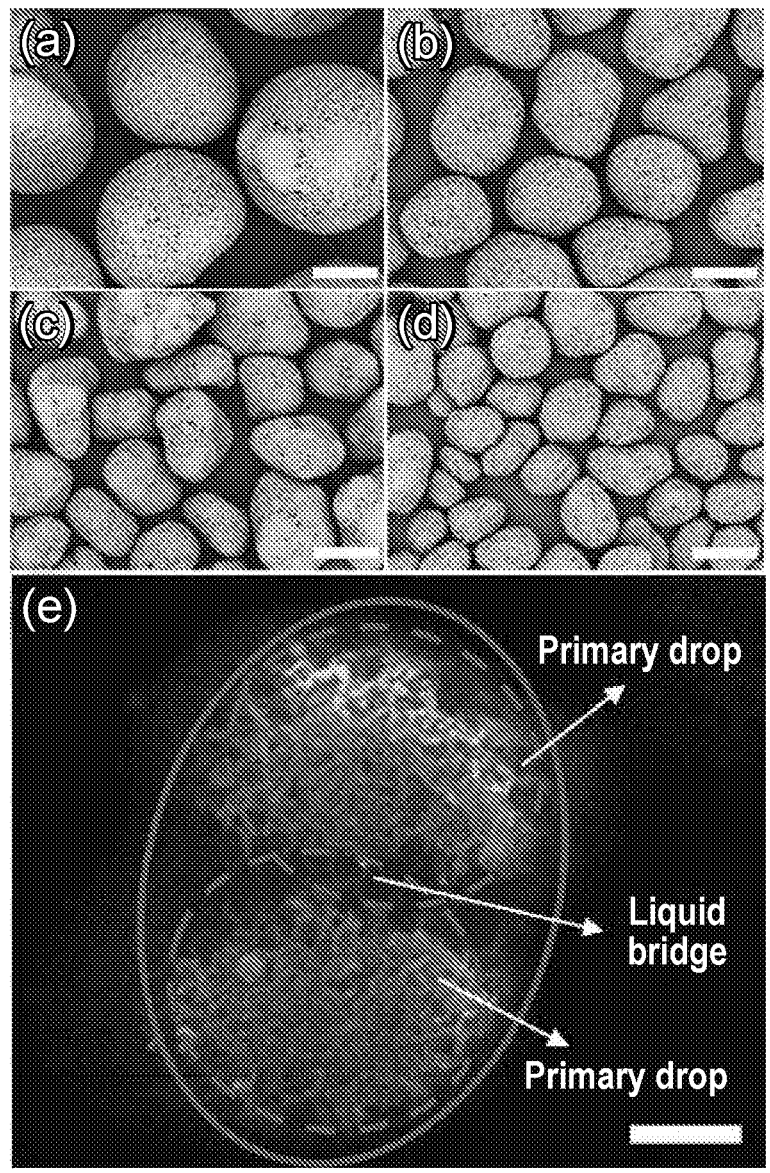

In the cluster structure of FIG. 18(*e*), it can be seen that the two droplets (each denoted as a primary drop) are each composed of a polymer matrix. In between the two droplets is a region with a lower intensity of excitation light (denoted as a liquid bridge). This central region may imply the presence of trapped mineral oil within the particle, which can be removed during washing, for example with acidified methanol. The irregular shape of the cluster structure can be attributed to the partial coalescence of droplets during polymerization, resulting in the formation of stable, non-spherical structures of two or more drops. This process is known as arrested coalescence. Due to shear stress caused by agitation such as stirring, drops collide with each other, which can lead to their coalescence. During coalescence, the two drops merge via the formation of the aforementioned infinitesimal liquid bridge between them, which then expands to the size of the drops. The expansion of the connecting liquid bridge is driven by the Laplace pressure, which initially is singular due to the infinite curvature of the liquid interface at the point of contact with the drops. A complete fusion of the coalescing drops into a single spherical drop can be arrested in an intermediate shape if the Laplace pressure driving force is offset by a rheological resistance. In this instance, coalescence was arrested as a result of the internal elasticity of partially polymerised semisolid drops providing the rheological resistance to offset the interfacial pressure, thereby driving the two drops to minimise their surface area and interfacial energy. Although, as explained previously, in an oil-in-oil emulsion system, surfactant may not be added to the mineral oil, the applicant has found that, as a result of low interfacial tension (e.g. 5.12 mN m−1 in some examples), the interfacial driving force can be made relatively low, which assists in stabilising the arrested structures.

Droplets such as the ones described above, which as explained have an internal viscoelastic resistance, are highly flexible in their ability to form multiple connections between drops, even after an initial arrest event. This is because the distance between the individual drops in arrested structures may vary significantly; some drops may be quite closely packed while others may have a surprising amount of space between them. Thus restructuring of arrested drops can occur as a result of liquid meniscus expansion that drives the drops to relocate to denser clusters. In this way, the number of spherical drops that can cluster together can also vary. Thus in addition to the doublet structures just described, the present applicant has prepared emulsions in which some drops form in three-drop structures. This likely occurs since such structures are energetically more favourable than a two-drop assembly shown in FIG. 2(*e*). Indeed, some droplets were found to be formed from more than three drops. Thus the shape of the structure shown in FIG. 17(*b*) diagram (iii) could vary in dependence on the number of drops forming the cluster. For example, two drops could produce a cuboidal droplet, three drops could produce a tetrahedral droplet and more than three drops could produce a variety of polyhedral droplets. Another advantage in being able to create such structures is that the anisotropy of multi-droplet cluster structures significantly adds versatility to the final particle shapes because of the multiplicity of orientations possible for the third and any subsequent drop. This anisotropical variation can give rise to a variety of particle shapes, because each particle grows around such a cluster. Referring to FIG. 18(*a*)-(*d*), each of which shows a batch of particles prepared according to one of the examples of Example Set II discussed below, it can be seen that the shapes of the particles in a batch are irregular. Some are oblong or cuboidal and some are tetrahedral, whilst the rest are a variety of different-sided polygonal shapes or of no particular shape. However, due to their initial formation from clusters of spherical or near-spherical drops, all are mostly smooth with rounded edges and corners. Thus they lack sharp corners or edges and often have no sharp corners or edges, which makes them structurally robust and stable against mechanical attrition.

The above-described anisotropic MIP particles have a lower packing density compared to regular spheres, which in combination with their relatively high true density and large size, make them better suited for use in $CO_2$ capture systems compared to previously-used porous adsorbents, such as activated carbon and MOFs.

The size of the particles was controlled by adjusting the stirring speed of the impeller during the polymerisation. The effects that can be thus achieved will be discussed below with reference to Examples Group II.

Wash

Following the polymerization process, the continuous phase can be removed, for example by ultrasound or mechanical agitation (for example centrifugation) or soxhlet extraction, using hot wash water or some other suitable wash. If the continuous phase were to be left on the polymeric material, it would reduce the surface area available for adsorption, although target gas molecules, for example $CO_2$, could still be adsorbed. In examples which use a stabilizer, this can also be removed.

Template Removal

The template can also be removed from the polymeric structure. The template can be removed by a number of techniques, including washing with a suitable solvent, using polar solvents such as a mixture of methanol and hydrochloric acid. These may be particularly suitable for removal of an oxalic acid template, but the skilled reader will appreciate that other, similar substances may be used to remove other templates. Other possible techniques for removing the template include physical extraction such as ultrasound or microwaves or heating with a (highly) polar solvent to subcritical or supercritical temperatures. Whichever method is chosen breaks the bonding between the monomer and template, such that the template is removed, leaving a nanocavity in the polymeric structure. In many of the present examples, this is a nanocavity suitable for adsorbing a $CO_2$ molecule on its wall. "Nanocavity" is not limited to a dimension or diameter of one nanometer, as will be seen in examples set out below, but is generally less than 2 nm and in many cases, preferably less than 1 nm.

Referring again to FIG. 17, template removal in an oil-in-oil emulsion example is indicated by a next stage (III). Diagram (iv) shows schematically a resulting structure in which the template 172 present in diagram (iii) has been removed, leaving a cross-linked polymeric structure based on the monomers 171. The continuous phase 10' can have already been removed, such that the overall structure is that of diagram (z), in which the continuous phase 10' is absent and the complexes 174 have nanocavities on which the functional group(s) of the monomer are incorporated. Mesoporous and/or macroporous cavities may also be present.

Finally, the structures of diagrams (z) and (iv) can be used in a next stage IV, to reversibly adsorb target gas molecules within the cavities. Thus diagram (iii) can also be considered to represent such adsorption, the template molecule 174 replaced with a target gas molecule.

It will be appreciated that in comparative examples where no template is used, the production process is simpler since there is no need for the template removal stage. In this case, rather than nanocavities, the surface of the resulting polymeric particles have functional monomers covalently attached to the surface of the polymer.

Analytical Methods

Determination of Particle Morphology

The particle morphology was analyzed using a TM3030 bench-top scanning electron microscope (Hitachi, Tabletop Microscope Europe) operating at an accelerating voltage of 15 keV. The samples were coated with gold/palladium (80/20) prior to the SEM to prevent accumulation of electrostatic charges on the particles. The sputtering rate was 0.85 nm per second at 2 kV and 25 mA of plasma current.

Determination of Particle Size Distribution

The particle size distribution was measured by dynamic light scattering using a laser diffraction particle size analyser, Malvern Mastersizer S (Malvern Instruments, UK). The mean particle size was expressed as the volume median diameter, Dv, 0.5, which is the diameter corresponding to 50% on the cumulative volume distribution curve. The degree of particle size uniformity was expressed as relative span:

$$\text{span} = \frac{Dv, 0.9 - Dv, 0.1}{Dv, 0.5} \quad (1)$$

where Dv, 0.1 and Dv, 0.9 are the diameters on the cumulative volume distribution curve corresponding to 10% and 90%, respectively.

Determination of Pore Size

The pore size analysis was performed using a Micromeritics ASAP 2020 H D Accelerated Surface Area and Porosimetry System at 77 K in a liquid nitrogen bath. Prior to each measurement, the samples were degassed at 80° C. overnight. The specific surface area was estimated by the Brunauer-Emmett-Teller (BET) method over a relative pressure range, $P/P_0$, of 0.06-0.3. The mesopore size distribution was determined using the Barrett-Joyner-Halenda (BJH) model and the total pore volume was calculated from the amount of $N_2$ adsorbed at $P/P_0$ of 0.99. Micropore size distributions and pore volume of micropores were measured using the Horvath-Kawazoe (HK) model for $P/P_0$ smaller than $10^{-2}$.

Confocal Laser Scanning Microscopy (CLSM)

The texture of the particles was visualised using a Nikon Eclipse TE300 confocal inverted microscope connected to a computer running Zeiss LaserSharp 2000 software. The fluorescent particles were synthesised by adding fluorescein isothiocyanate isomer I (FITC) into the pre-polymerisation mixture. The stained particles were placed on a microscope slide, and the FITC was excited with an argon laser at a wavelength of 492 nm and a helium-neon laser with a wavelength of 518 nm. The emitted fluorescence was detected by a photomultiplier tube at 515±30 nm (the green region).

Determination of Particle Density

The particle density was measured using a helium pycnometer 9200 (Micromeritics, US). The particles were dried overnight in a vacuum oven at 80° C. prior to the measurement. For each test, five runs were performed and the average value taken.

Measurements of Fluid Properties

The fluid density and interfacial tension of droplet clusters were measured using a pycnometer, and Krüss DSA-100 pendant drop tensiometer, respectively. Each measurement was repeated three times, and the average value was reported.

Determination of Thermal Stability of the Particles

For examples in which a template was used, the thermal stability of the particles was characterized using a thermogravimetric analyzer (TGA) Q5000IR (TA Instruments, US) under a nitrogen flow rate of 20 mL/min by heating 10-20 mg of the polymeric material from 50 to 600° C. at a ramp rate of 10° C./min.

Determination of Particle Composition and Structure

X-ray photoelectron spectroscopy (XPS) of the particles was performed on a K-ALPHA spectrometer (Thermo Scientific, UK) using monochromatic Al Kα X-rays (36 W, 400 μm spot size) and low-energy electron/ion flooding for charge compensation. Survey scan spectra for elemental analysis were obtained using a pass energy of 200 eV, a step size of 1 eV, a dwell time of 10 ms and 15 scans. High-resolution scans of the C 1 s, O 1 s and N 1 s peaks were acquired using a pass energy of 50 eV and a step size of 0.1 eV with a dwell time of 50 ms and 10 scans.

Determination of Functional Groupings on the Polymeric Particles

Fourier transform infrared (FTIR) spectroscopy was used to measure the FTIR spectra over a range of 500-4000 $cm^{-1}$ using a Thermo Scientific Nicolet iS50 ATR spectrometer with a monolithic diamond crystal. The samples were placed on the Universal diamond ATR top-plate and the spectrum was recorded within 32 s.

Figure 3:
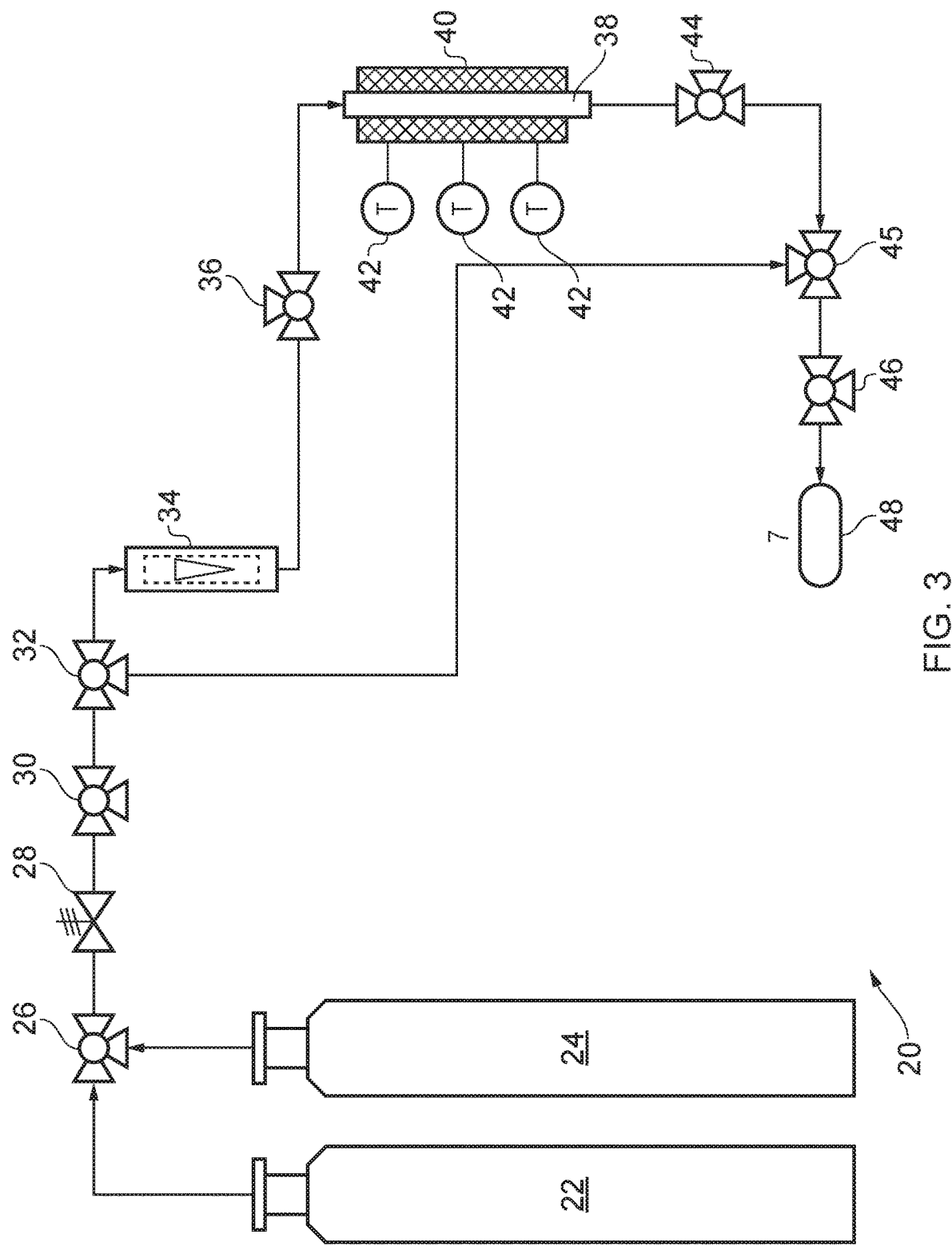
FIG. 3 shows schematically a fixed-bed adsorption system used to test the carbon dioxide adsorption capability of polymeric materials.

Determination of Carbon Dioxide Adsorption Capability of the Particles $CO_2$ adsorption on the synthesized particles was investigated in a fixed-bed column 20 made of stainless steel, indicated schematically in FIG. 3. The column includes a cylinder 22 containing a $CO2/N_2$ gas mixture and an $N_2$ cylinder 24. These are connected as inputs into a first three-way valve 26. An outlet of the first valve 26 connects via a pressure relief valve 28 to a second three-way valve 30. An outlet of the second three-way valve 30 feeds to a third three-way valve 32. An outlet of the third three-way valve 32 connects via a mass flow controller 34 to a fourth three-way valve 36. An outlet of the fourth three-way valve 36 feeds to an entry point of a fixed-bed column 38 disposed within a heating system 40. One or more thermocouples 42 measure and control a temperature of the column 38. An exit point of the column 38 is connected to an input of a fifth three-way valve 44, an outlet of which feeds to a sixth three-way valve 45. Another input of the sixth valve 45 is connected to an outlet of the third three-way valve 32 such that gas can be flowed to the sixth valve 45, bypassing the column 38. An outlet of the sixth three-way valve 45 feeds into a seventh three-way valve 46 and an outlet of the seventh three-way valve 46 is connected to a $CO_2$ gas analyser 48.

In operation, the column 38 can be loaded with polymeric particles for testing. Appropriate operation of the various valves 26, 28, 30, 32, 36, 44, 45, 46 can allow gases to be flowed from the cylinders 22, 24, either through the column 38 or bypassing the column, such that concentrations of gases can be measured and compared to determine the adsorption effectiveness of the polymeric material.

It will be appreciated that other bed arrangements could be used and that other gas mixtures could be tested.

In each test the column (15.8 mm O.D. and 9.25 mm I.D.) was loaded with 2-3 g of the particles sieved using a 0.075 mm stainless steel mesh. After loading, a 0.035-mm stainless steel mesh and a quartz wool plug were placed on either side of the bed to retain the particles. An in-house temperature controller (system 40) was used to provide a uniform temperature along the column. The gas flow rate through the system was controlled using a mass flow controller provided by Alicat Scientific Inc, UK (mass flow controller 34). Prior to each adsorption test, the particles were purged with $N_2$ for 2 h at 120° C. and 130 mL/min. The column was then sealed on both sides and left to cool down to a pre-determined adsorption temperature, followed by passing the feed stream composed of 15 vol % $CO_2$ and 85 vol % of $N_2$ through the bed at 130 mL/min. A $CO_2$ infrared analyzer (Quantek Instruments, USA) was used to continuously monitor the $CO_2$ concentration in the outlet stream (analyzer 48). The $CO_2$ breakthrough curves were corrected by subtracting the mean resistance time of the gas stream (58 s at 130 mL/h and 40° C.), which was measured by flowing the feed gas mixture through the empty column.

The $CO_2$ adsorption capacity, q, was calculated using the following equation:

$$q = \frac{QC_i t_{ad}}{m_s} \quad (2)$$

where q (mmol/g) is the $CO_2$ adsorption capacity, Q (mL/min) is the feed gas flow rate upstream of the column, $m_s$ (g) is the mass of the particles in the column, and $C_i$ (mmol/m L) is the concentration of $CO_2$ in the feed stream calculated using Eq. (3):

$$C_i = \frac{n_i P}{RT} \quad (3)$$

where $n_i$ is the molar fraction of $CO_2$ in the feed gas ($n_i$=0.15 in some present examples), P (kPa) is the total pressure of the gas stream (~102 kPa in some present examples), T (K) is the adsorption temperature, R is the universal gas constant, 8.314 J/(K·mol), and $t_{ad}$ is the stoichiometric time, which is equal to the breakthrough time in an ideal adsorption column with a vertical breakthrough curve, i.e., in a column operating at 100% $CO_2$ removal efficiency until the particles are fully saturated with $CO_2$.

The $t_{ad}$ value corresponds to the area between the breakthrough curve and the vertical axis ($C_o/C_i$) and can be calculated as:

$$t_{ad} = \int_0^t \left(1 - \frac{C_o}{C_i}\right) dt \quad (4)$$

where $C_o$ (mmol/mL) is the $CO_2$ concentration in the effluent stream and t (min) is the time. The particles were evaluated based on their equilibrium $CO_2$ adsorption capacity, $q_{eq}$ which is a q value corresponding to $C_o/C_i$=1. The equilibrium adsorption capacity occurs when the effluent concentration reaches the feed gas concentration, and the material is no longer capable of adsorbing $CO_2$.

Adsorption Isotherms of CO2 and N2

The adsorption isotherms of CO2 and N2 in the pressure range of 0-1 bar and at temperatures of 273 K and 298 K were obtained using a Micromeritics ASAP 2020 static volumetric apparatus equipped with a Micromeritics ISO Controller. Prior to each test, the particles were degassed under vacuum at 80° C. overnight.

Droplet Formation Using Membrane Emulsification

For a membrane with regular pore spacing such as a hexagonal pore array, $D_{v,0.5}{}^d$ can be correlated with the droplet formation time, $t_d$ and the transmembrane flux, $J_d$, using the following equation:

$$D_{V,0.5}^d = \left(\frac{3\sqrt{3}}{\pi k} J_d L^2 t_d\right)^{1/3} \quad (5)$$

where L is the membrane pore spacing and k is the fraction of active pores. For membranes not having a fixed pore spacing, L can be the average pore spacing specified by the manufacturer or an average pore spacing determined by other information pertaining to the membrane being used.

At constant $J_d$ and k values, an increase in stirring rate leads to an increase in the drag force acting on the droplets during formation on the membrane surface and thus the droplet formation time is shorter, causing a reduction in $D_{v,0.5}{}^d$ based on Eq. (5). The effect of flux on $D_{v,0.5}{}^d$ differs depending on the rotational speed of the stirrer. At higher stirring rates (800-1200 rpm), the droplets were smaller, which may be attributed to them not touching each other whilst growing on the membrane surface. In this case, at higher dispersed phase flux, a higher amount of the dispersed phase will flow into the growing droplet during pinch off and larger droplets will be formed. At lower stirring rates (100-600 rpm), the size of adjacent growing droplets may become comparable with the membrane pore spacing ($D_{v,0.5}{}^d \approx L$), causing the forming drops to touch each other on the membrane surface and exert an additional force, the push-off force. The push-off force arises from droplet deformation and acts normal to and away from the membrane surface, i.e. in the opposite direction to the interfacial tension force, leading to shorter droplet formation time and lower $D_{v,0.5}{}^d$ values at higher fluxes.

EXAMPLES

Example Set I—Oil-in-Water Emulsion

The following exemplary components were used for a series of examples as detailed in Table 2, which sets out formulation parameters and polymerization conditions:

Template—Oxalic acid (OA)
Monomer—acrylamide (AAm)
Cross-linker—Ethylene glycol dimethacrylate (EGDMA)
Initiator—azobisisobutyronitrile (AIBN)
Dispersed phase solvents (oil phase)—acetonitrile (AN) and toluene (TL)
Continuous phase liquid (aqueous phase)—polyvinyl alcohol (PVA)-(Mw=13,000-23,000, 87-89% hydrolyzed)
Template removal—methanol and 0.1 M hydrochloric acid
Surfactant removal—hot water Sample b.2 was prepared as a comparative example without the use of a template and hence a dash is shown in the "OA" column. For the samples in which a template was used, it was removed by washing the particles several times with a 1:9 (v/v) mixture of hydrochloric acid and methanol, until no oxalic acid was detected in the rinses by a Lambda 35 UV/VIS spectrometer (PerkinElmer, US). The extraction of the template from the particles resulted in formation of nanocavities decorated with covalently attached amide groups (as shown schematically in FIGS. 1(*d*) & 17(*e*)).

A 500-mL jacketed reactor equipped with a four-neck lid was used for the suspension polymerization. The emulsion was agitated using a four-bladed impeller with a diameter of 50 mm, to cause emulsification. After polymerisation, the suspension was filtered using a Buchner funnel apparatus with a filter paper (Gard 3, Whatman 6 μm) before washing as discussed in the following.

Effect of Washing Technique

Figure 4:
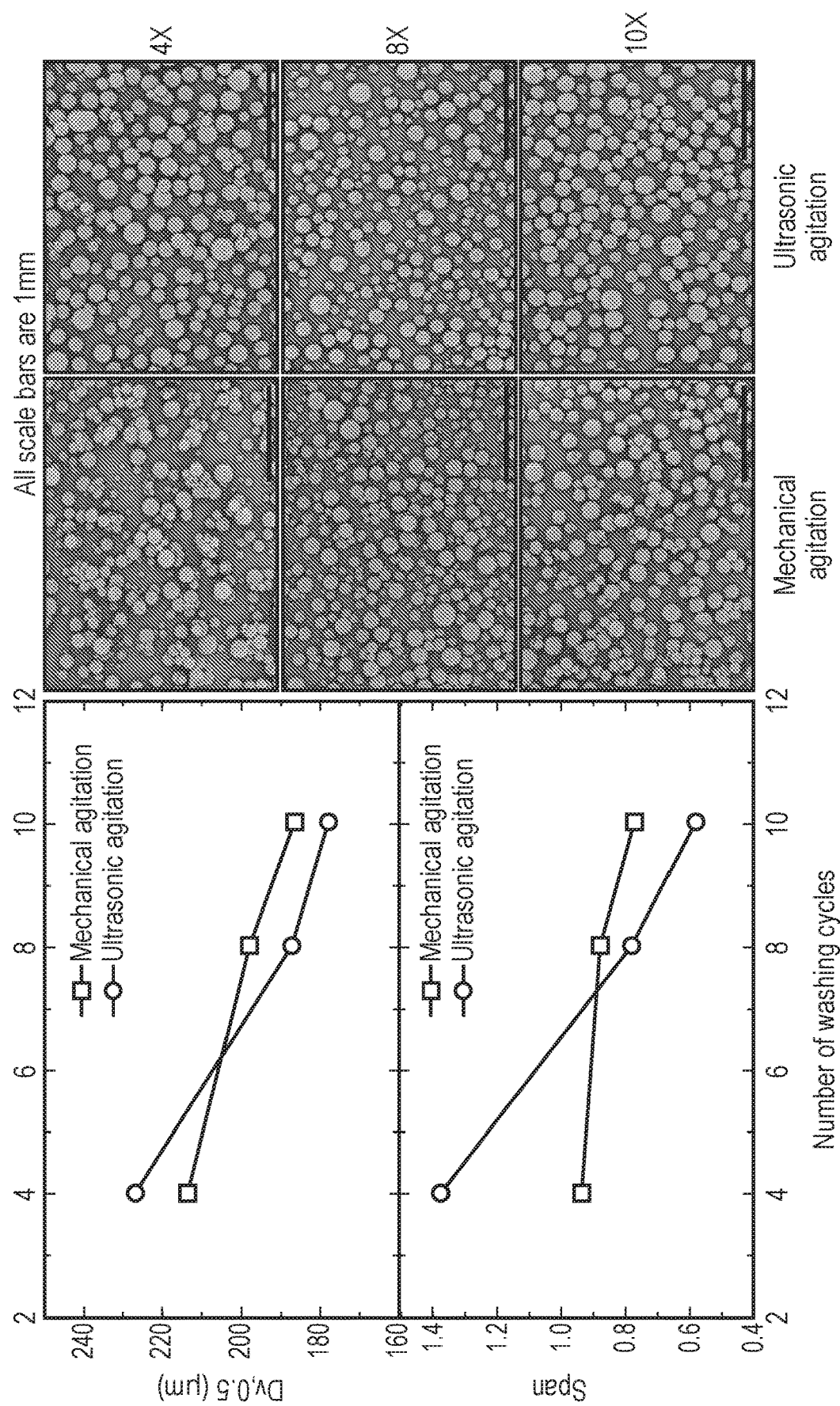
FIG. 4 shows a comparison between two particle washing procedures.

The surfactant (PVA) was removed from the product suspension using two agitation methods, mechanical and ultrasonic agitation. In both methods the temperature of the wash water was kept at 85-90° C. for 5 minutes, followed by water extraction and addition of fresh hot water for the next wash cycle. The particle morphology and size distribution were determined after 4, 8, and 10 wash cycles by scanning electron microscopy (SEM) and dynamic light scattering. FIG. 4 shows the effect of the two different particle agitation methods during washing on the morphology and size distribution of the particles after 4, 8, and 10 wash cycles. On the left hand side of the figure, the median particle diameter and the span (as calculated per equation (1)) are plotted against number of wash cycles. The right hand side of the figure shows SEM images of the resulting particles after 4, 8 and 10 wash cycles, using each type of agitation. On the SEM images, it can be seen that after 8 and 10 wash cycles the particles agitated using ultrasound were considerably less agglomerated than mechanically agitated particles, and that is confirmed by the lower Dv,0.5 and span values. After 10 ultrasound treatments, almost no agglomerated particles were detected. Thus this could be considered to be an optimum treatment, but a material displaying good adsorption properties could be made using fewer treatments and/or mechanical agitation.

Characterization of the Prepared Particles

Figure 5:
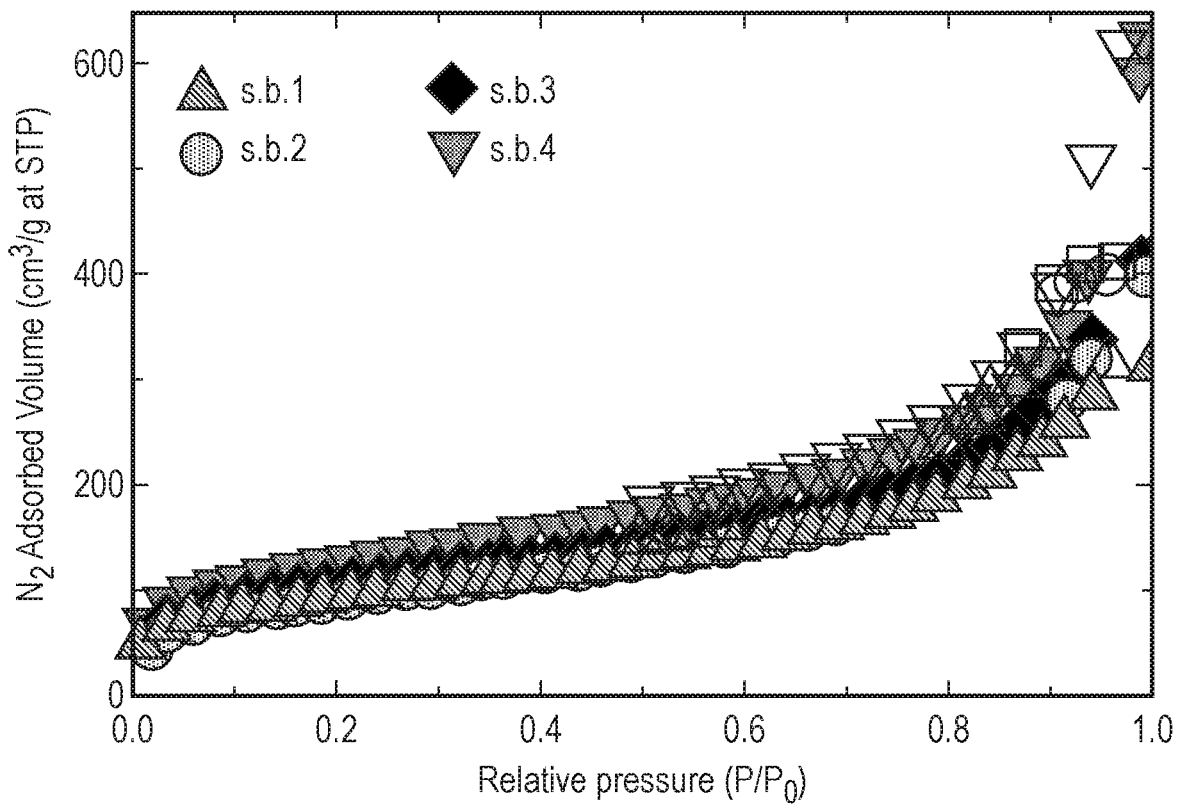
FIG. 5 shows nitrogen adsorption-desorption isotherms for prepared samples.

Following self-assembly, the distance between adjacent $NH_2$ groups in the organic phase prior to polymerization was 0.45-0.7 nm, which is ideal for hydrogen bonding with $CO_2$ molecules, which have a kinematic diameter of 0.33 nm. The physisorption data obtained from liquid nitrogen adsorption/desorption curves of the prepared samples are presented in FIGS. 5-7. FIG. 5 shows the results of surface analysis of particles and indicates that they have a type II or a type IV adsorption isotherm based on IUPAC classification, featured by a hysteresis loop, which may be attributed to capillary condensation in mesopores. Therefore, the material can be classified as a mesoporous adsorbent. Samples b.1, b.2 and b.3 can be considered to be type IV and sample b.4 can be considered to be type II.

Figure 6:
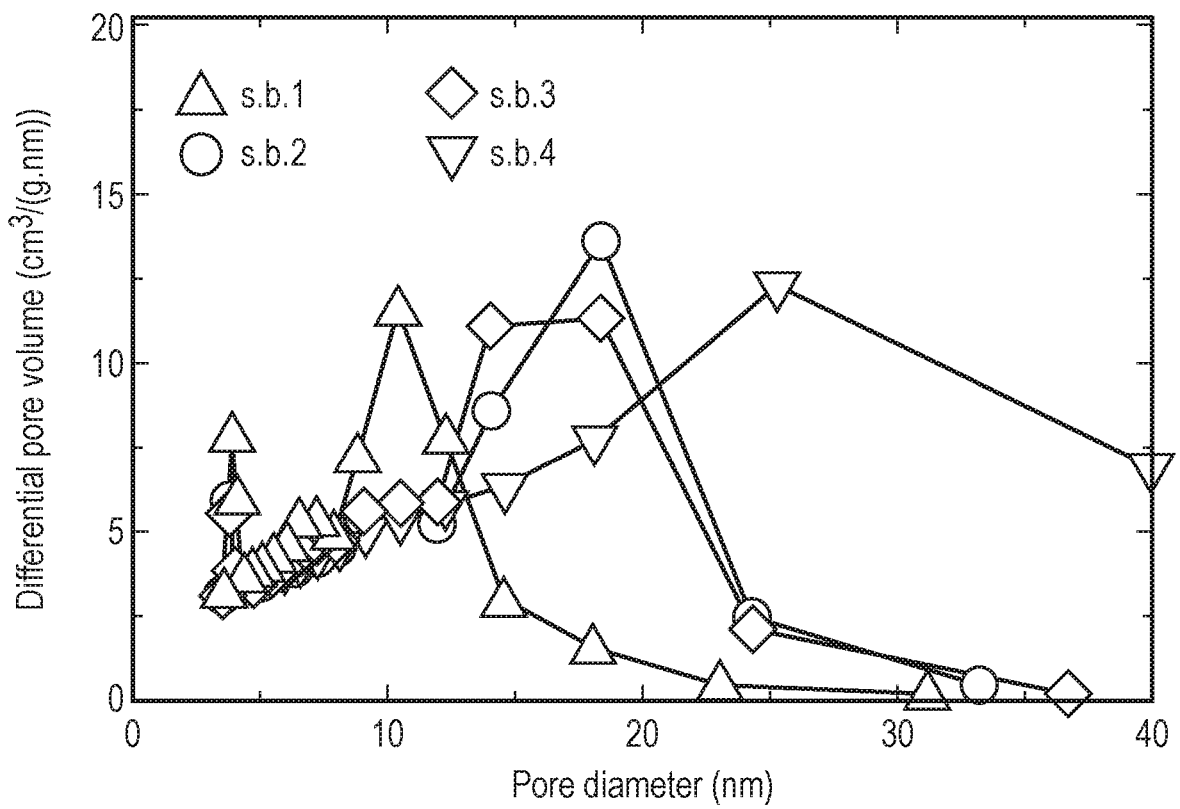
FIG. 6 shows mesopore size distribution curves for prepared samples.

It can be seen from the relatively narrow peaks in FIG. 6 for samples b.1-3 that suspension polymerization using a monomer-template complex leads to much more uniform mesopore size distribution than bulk polymerization as used in some prior art procedures. In addition, particles synthesized by bulk polymerization follow a type II adsorption/desorption isotherm with an average pore size of 10-24 nm, which is larger than the 5-15 nm found in present examples (Table 2 final column). The $S_{BET}$ values were 328-443 $m^2/g$, compared with 80-258 $m^2/g$ reported in bulk polymerization. Moreover, the maximum specific pore volume of 0.92 $cm^3/g$ for the sample b.3 (Table 2) was considerably higher than the maximum $V_p$ value in bulk polymerization.

Figure 7:
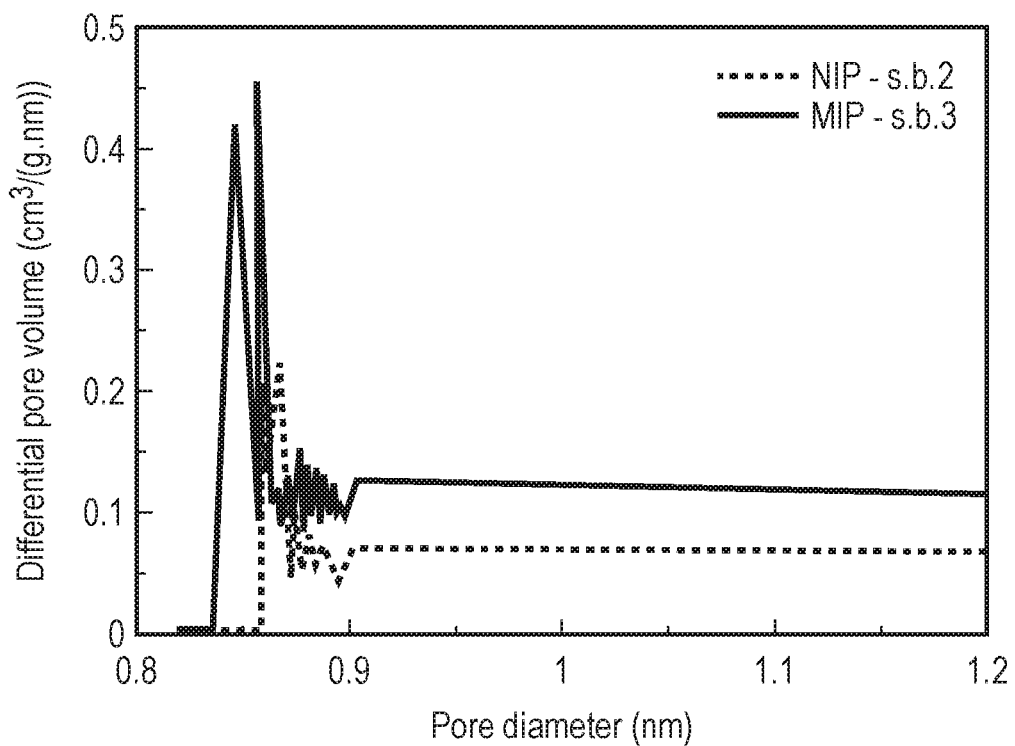
FIG. 7 shows nanocavity size distributions of a prepared molecularly imprinted polymer (MIP) sample and a comparative sample prepared without molecular imprinting (NIP)

Since the created nanocavities lie over the micropore range (smaller than 2 nm), a comparison on micropore size distribution between molecularly imprinted polymer particles b.3, and non-imprinted polymer particles b.2 was made. The results are shown in FIG. 7. Both samples were prepared in the same conditions, except for the fact that in b.2 no template (OA) was used. There are two distinct peaks for b.3 in 0.84 μm and 0.85 μm micropores which is significantly larger than the one for b.2, implying the presence of nanocavities in molecularly imprinted polymer particles. In addition, the total pore volume in the micro range was measure 0.1 $cm^{-3}/g$ for .b.3 which was almost 1.7 times larger than b.2. Higher performance of b.3 in comparison with b.2 was confirmed by $CO_2$ capture measurement. The $CO_2$ capture capacity of MIP particles was 2.5 times higher than that of NIP particles (FIG. 10), which can be attributed to the nanocavities in MIPs. This is discussed further below. Nonetheless, the $CO_2$ capture capability of the NIP particles could be considered to be acceptable for some practical uses.

Thermal Stability of the Particles

Figure 8:
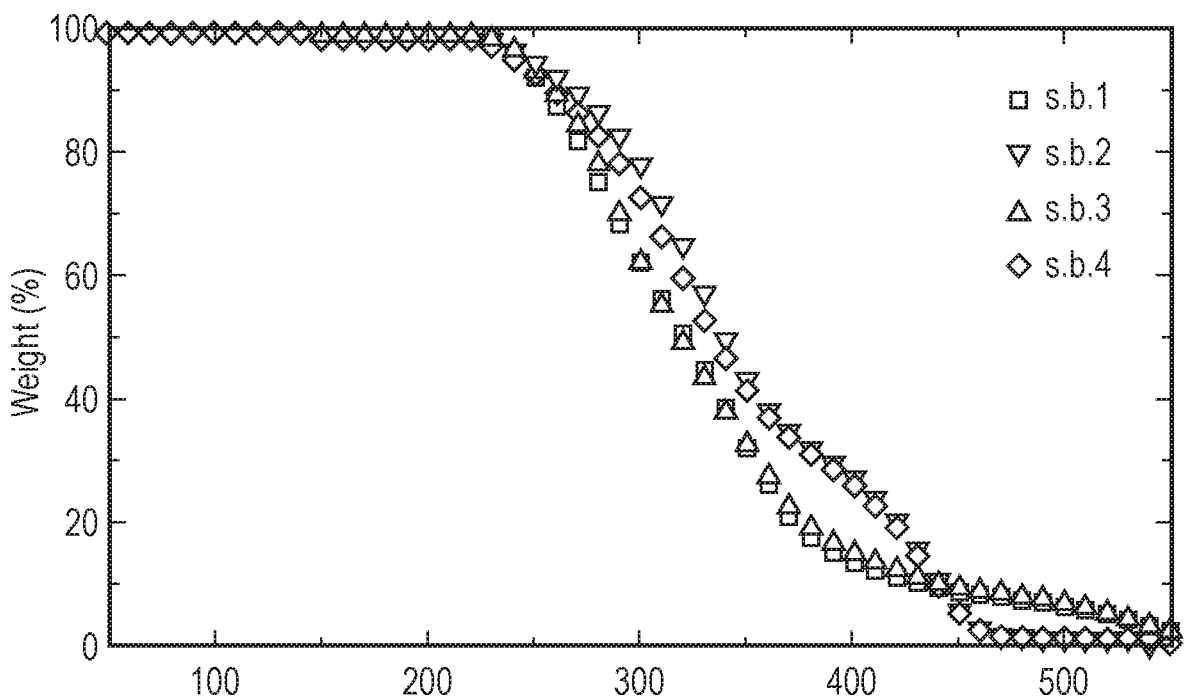
FIG. 8 shows thermogravimetric analysis of prepared samples.

FIG. 8 shows the TGA curves for the prepared samples. The TGA curves of the samples were measured over a temperature range of 150-600° C. at a temperature ramp rate of 10° C./min and under nitrogen flow. All TGA curves have similar patterns with no weight loss up to 220° C. and a thermal decomposition temperature corresponding to 5% weight loss occurring at 240-255° C., which is well above a desorption temperature suitable for regeneration. Thus it can be understood that the inventive samples showed a good stability over many prior art materials, and thus that a good stability over multiple use and regeneration cycles would be expected.

Effect of Stirring Speed on Particle Size

As previously discussed, inappropriate particle size can considerably limit the applicability of solid sorbents, and particles for $CO_2$ capture in fluidized beds should ideally be large Group A particles or small Group B particles according to the Geldart classification. Based on the particle density measured in present examples (1.3 $g/cm^3$), their smallest size would be approximately 120 μm to fall under these categories. Thus the particles were found to belong to Geldart Group A, referred to as aeratable particles. These particles can be used in a fixed bed system or can be easily fluidised, with homogeneous fluidisation at low superficial gas velocities and relatively small bubbles at higher velocities. This indicates another improvement over material made by bulk polymerization processes.

Figure 9:
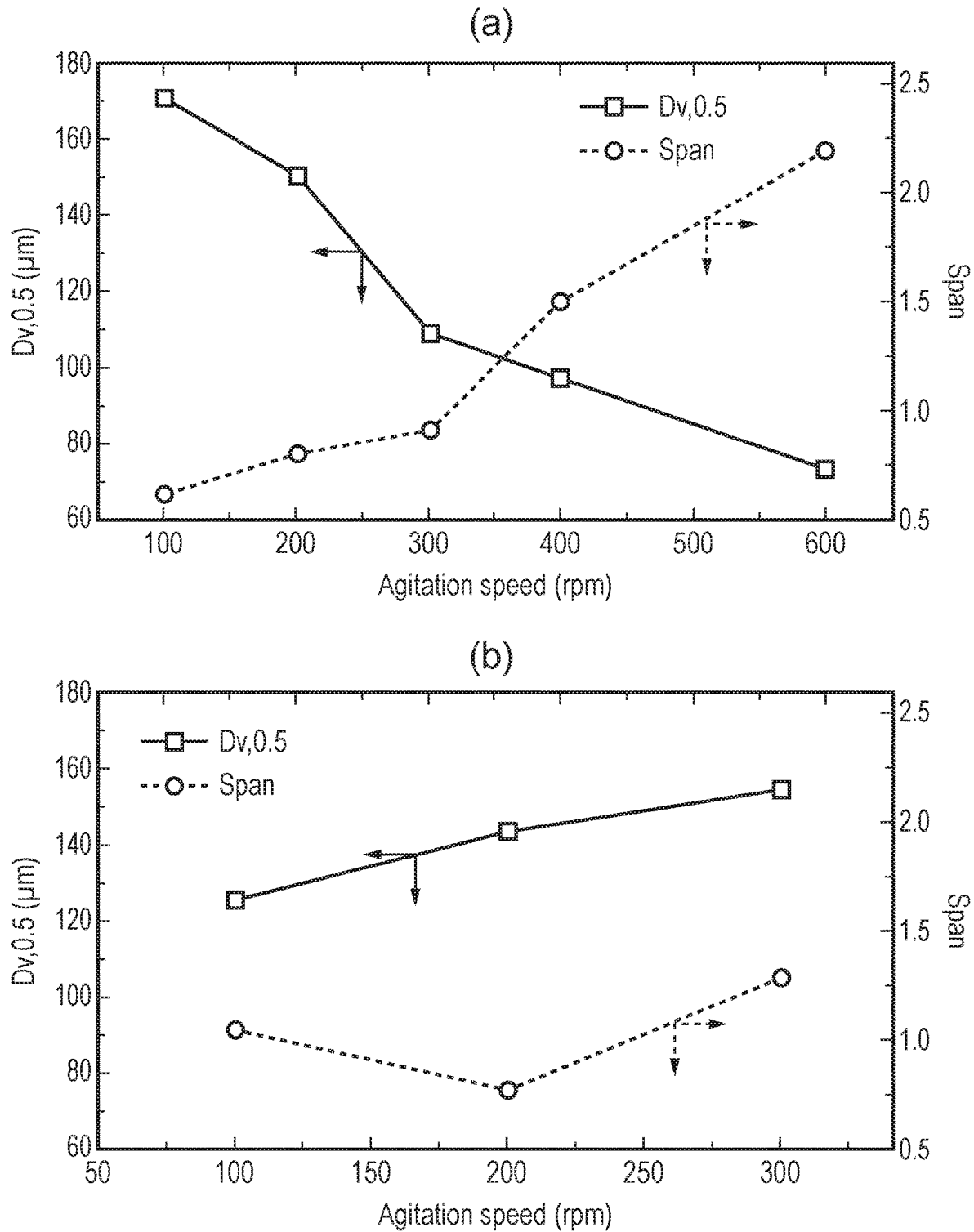
FIG. 9 shows the effect of stirring speed during polymerization.

The particle size was controlled by varying the agitation rate in the reactor and the concentration of surfactant in the aqueous phase. The effect of agitation speed in the reactor on the mean droplet size at two different dispersed phase contents, $\phi_o$, is shown in FIGS. 9a and 9b. At $\phi_o$=9%, an increase in stirring rate from 100 to 600 rpm caused a decrease in the droplet size from 171 to 73 μm. At $\phi_o$=20%, an opposite trend was observed and an increase in agitation speed led to an increase in the droplet size. In stirred vessels, there are two factors that determine the particle size of an emulsion: droplet breakage due to viscous and/or inertial forces, and droplet coalescence, due to droplet collision. At low $\phi_o$ values, the droplet breakup is a dominant factor controlling the droplet size, and an increase in the agitation speed results in higher shear forces exerted by the impeller on the droplets and their fragmentation into smaller droplets. At higher $\phi_o$ values, droplet coalescence dominates over droplet breakup and consequently leads to larger droplets at higher stirring rates. At $\phi_o$=9 vol %, the particles fabricated at 100-300 rpm display a good uniformity in size with a span of 0.6-0.91 (FIG. 9a, first three points on the span graph). On the other hand, at 400-600 rpm the particles were more polydispersed with a span of up to 2.2. At $\phi_o$=20%, the particle size distribution appeared to be independent of the stirring rate and a good size uniformity was observed, with the span varying between 0.77 and 1.29.

$CO_2$ Adsorption Capacity of Synthesized Particles

Figure 10:
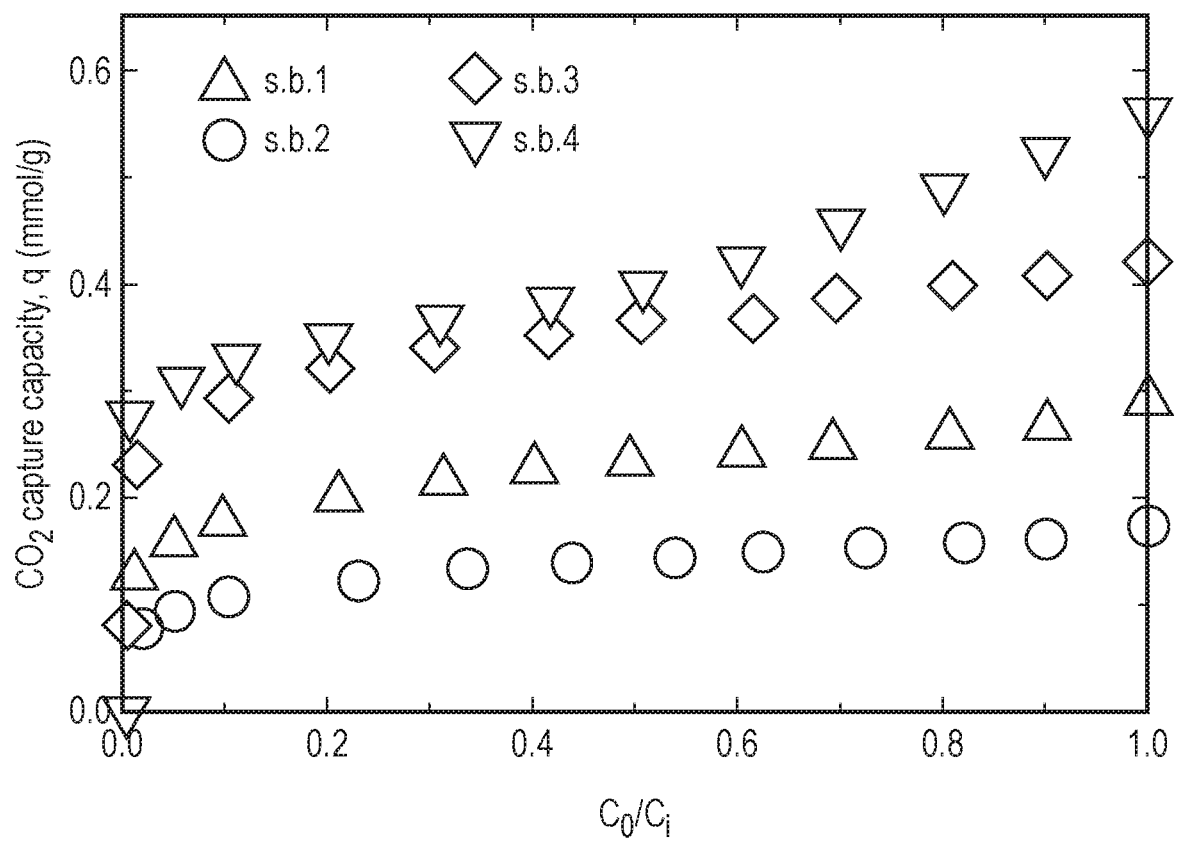
FIG. 10 shows carbon dioxide adsorption capacity versus the ratio of carbon dioxide concentration in effluent to feed gas of prepared samples.

The $CO_2$ adsorption capacity for different samples over the range of $C_o/C_i$ from 0 to 1 is shown in FIG. 10. Graphs for samples 1, 3 & 4, which were produced using a template and are thus molecularly imprinted, are shown with solid symbols. A graph for sample 2, which was prepared without a template, is shown with outline symbols.

In particular, FIG. 10 shows the effect of molecular imprinting on $CO_2$ adsorption capacity. Sample b.2 shows a lower adsorption capability, which can be explained by the lack of template during the production process and hence the lack of nanocavities. As a result, the best adsorption capacity among the samples ($q_{eq}$ for b.3) was 0.42 mmol/g, as compared to 0.17 mmol/g for the non-imprinted sample b.2. The high affinity of MIP particles towards $CO_2$ can be attributed to a combination of size exclusion effect on gas molecules, which is based upon their size and shape, and dipole-dipole interactions between $CO_2$ molecules and $CO_2$-philic moieties (for example $NH_2$ in some present examples) inside the cavities. As previously discussed, the cavity architecture (size and shape) facilitates the entrapment of $CO_2$ molecules in the polymer matrix due to structural compatibility of the cavities and $CO_2$ molecules. In addition, larger quadrupole moment and polarizability of $CO_2$ molecules compared to $N_2$ molecules (2.85 to 1 and 1.5 to 1, respectively) enhance the affinity of protic $NH_2$ groups on the cavity walls towards the $CO_2$ molecules, leading to higher $CO_2$ uptake. Thus the samples prepared using a template display a selective affinity for capturing $CO_2$ from a gas stream comprising a mixture of gases.

Another effect on $CO_2$ adsorption capacity indicated by FIG. 10 is the volume ratio of the two solvents. When the volume ratio of the two exemplary organic solvents (AN to TL in the present samples) was reduced from 50:50 to 30:70 per sample b.3, an increase in $q_{eq}$ $S_{BFT}$, and $V_p$ was observed, despite the template concentration being the same as that of sample b.1. As previously discussed, apolar, non-protic solvents, such as toluene, can stabilize hydrogen bonds and maximize the likelihood of complex formation between the template and the monomer, which leads to a larger number of cavities and enhanced affinity towards the target molecules. The polarity index of TL (2.4) is lower than that of AN (5.8), which allows stronger template-monomer interactions in a pre-polymerization solution. This can explain the higher adsorption capacity of sample b.3. Another factor is increased particle porosity, which can facilitate the diffusion of $CO_2$ through the polymer matrix, resulting in a higher $CO_2$ adsorption capacity for sample b.3 compared with b.2.

Figure 11:
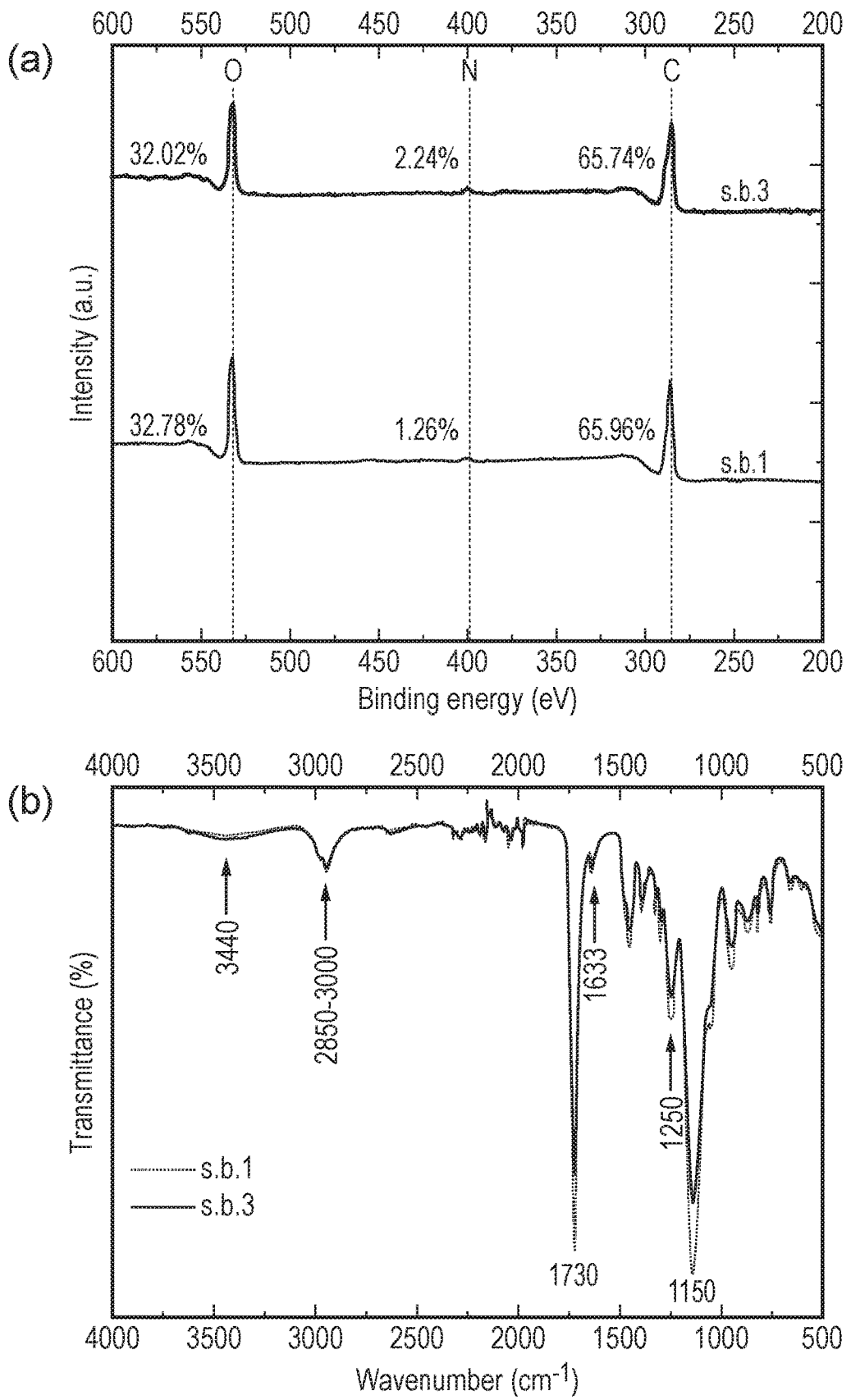
FIG. 11 shows surface chemical analysis and Fourier transform infrared spectroscopy (FTIR) analysis of prepared samples.

The $CO_2$ adsorption capacity of sample b.1 is slightly lower than the other two molecularly-imprinted samples. This can be explained by the lower template concentration in the solvent, which in turn may be due to a smaller number of $NH_2$ groups per nanocavity. This result can be considered to show that a main parameter affecting the $CO_2$ adsorption capacity is the density of $NH_2$ active sites on the surface, rather than specific surface area or total pore volume. As shown in FIG. 11(a), the nitrogen fraction of b.3 was 1.8 times larger than that in b.1 and as a result, $q_{eq}$ (carbon dioxide adsorption capacity) was 1.5 times larger than that of b.3.

The FTIR spectra of samples b.1 and b.3 is shown in FIG. 11(b). The peak at around 3440 $cm^{-1}$ on both spectra can be attributed to amine N—H stretching vibrations. A more intense N—H stretching peak was obtained for b.3, which corresponds to the fraction of nitrogen on the surface found by XPS. A similar relationship between the peaks was observed at 1663 $cm^{-1}$ which can be attributed to N—H bending vibrations. The two peaks at 1150 $cm^{-1}$ and 1250 $cm^{-1}$ can be attributed to C—N stretching vibration. Therefore, the results imply the presence of amine groups on the surface of synthesized adsorbents. The peak at 1730 $cm^{-1}$ can be attributed to C=O bonds in AAm and EGDMA, and the peaks at 2850-3000 $cm^{-1}$ can be attributed to C—H stretching vibration. There is no peak in the range of 1680-1640 $cm^{-1}$ corresponding to C=C stretch in EGDMA and AAm. This implies that there is no monomer or cross-linker left in the polymer particles and all carbon-carbon double bonds are broken and hence that the production process worked as expected. The peaks over the range of 910-665 $cm^{-1}$ could be attributed to N—H wagging vibration.

Figure 12:
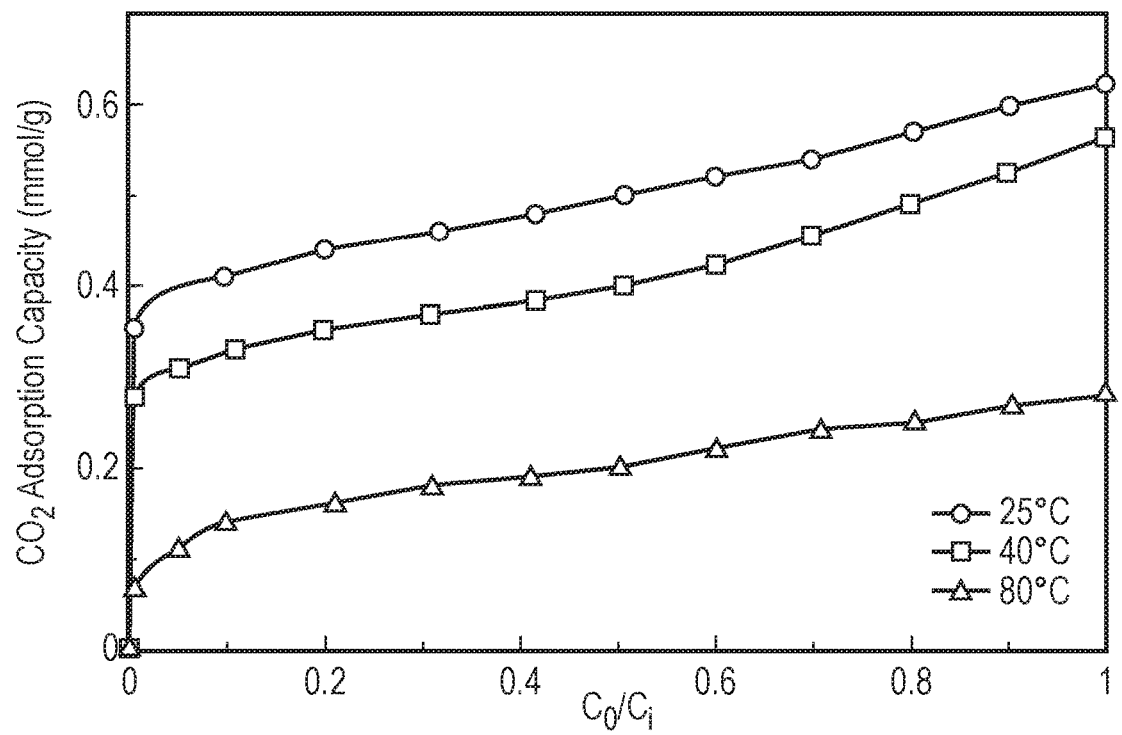
FIG. 12 shows the effect of temperature of carbon dioxide adsorption capacity of a prepared sample.

The effect of temperature on $CO_2$ adsorption capacity q for b.4 is shown in FIG. 12. As expected, a considerable decrease in $q_{eq}$ from 0.62 mmol/g to 0.28 mmol/g was observed as the temperature increased from 25° C. to 80° C. This effect can be attributed to the exothermic nature of the adsorption process and weakened hydrogen bond interactions between $CO_2$ and $NH_2$ groups at higher temperatures. Nonetheless, adsorption capability at 40° C., which may be a typical flue gas temperature, is good. Indeed, the results indicate useful adsorption capacity at a range of temperatures which would be useful for capturing carbon dioxide from various industrial processes, which are likely to emit a gas stream at a temperature significantly lower than 80° C.

Effects of Using Membrane Emulsification

A further sample having mass ratios of AAM to EGDMA and AAM to AIBN as per samples b.1 and b.4 was prepared using membrane emulsification instead of emulsification in the reactor by agitation as in previously-discussed samples. The emulsion was produced using a direct membrane emulsification technique, using a commercial Micropore Dispersion Cell (MDC) equipped with a flat disc membrane and a paddle-blade stirrer driven by a 24V DC motor (as discussed with respect to FIG. 2). The dispersed phase was injected at a constant flow rate through the membrane into 50 mL of a 0.5 wt % aqueous solution of PVA using a syringe pump (World Precision Instruments, Sarasota, US). The paddle stirrer fitted above the membrane provided an adjustable shear on the membrane surface to actively control the droplet size. A nickel membrane containing hexagonal arrays of cylindrical pores with a diameter of 20 μm and a pore spacing of 200 μm was fabricated by the LIGA (Lithographie, Galvanik and Abformung) process, which is based on lithography, nickel electroplating and molding. The membrane and MDC were supplied by Micropore Technologies Ltd (Redcar, UK).

Once the desired amount of dispersed phase passed through the membrane, the emulsion droplets were transferred to the jacketed reactor for polymerization. The remaining production steps were as per previously-described examples. The membrane was cleaned by immersing in a 15 vol % NaOH for 10 min, followed by 10 min soaking in 7 vol % citric acid and 20 min treatment with deionized water in an ultrasonic bath at 30° C.

Figure 13:
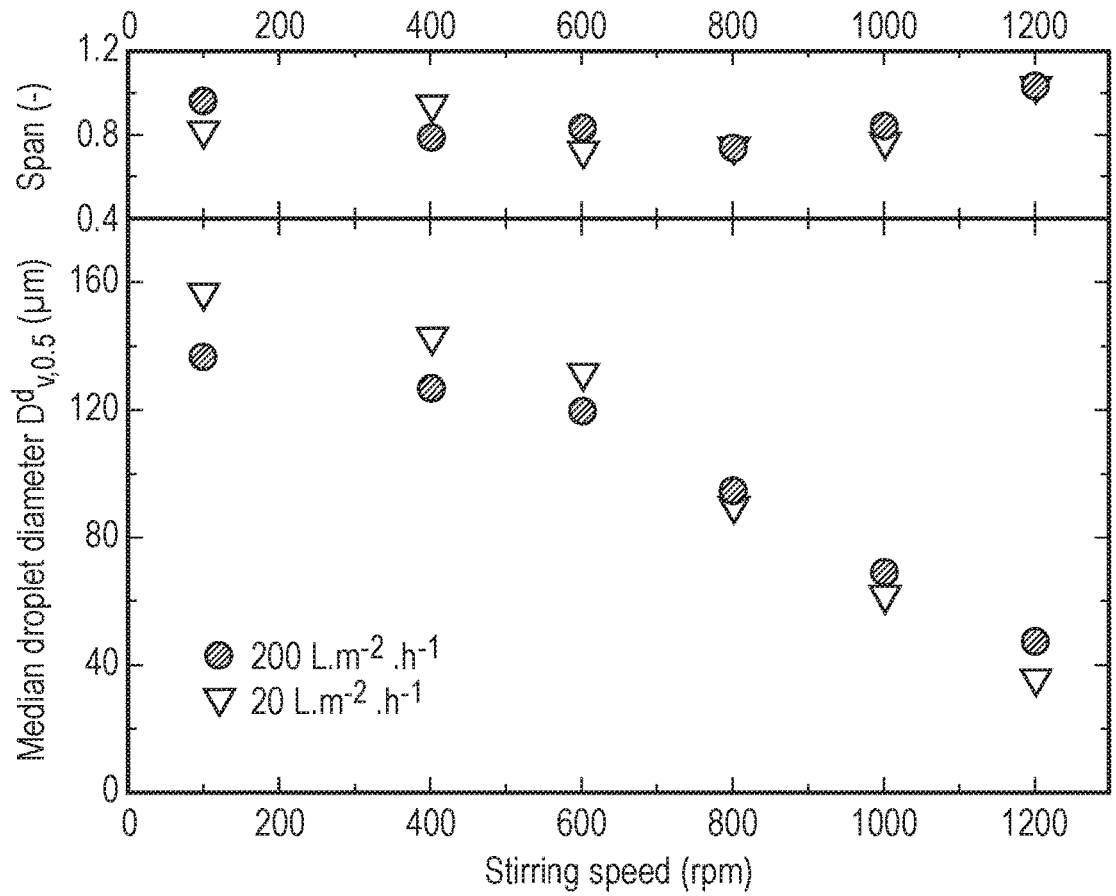
FIG. 13 shows the effect of stirring rate during an exemplary membrane emulsification process.

FIG. 13 shows the effect of stirring rate in the emulsification apparatus on the volume median droplet diameter, $D_{v,0.5}^d$, and span at the transmembrane flux of 20 and 200 $Lm^{-2}\ h^{-1}$. The dispersed phase content at the end of the process was 9 vol %. An increase in stirring speed from 100 to 1200 rpm caused a reduction in $D_{v,0.5}^d$ from 157 to 34 μm at 20 $Lm^{-2}\ h^{-1}$, and from 137 to 47 μm at 200 $Lm^{-2}\ h^{-1}$. As shown in FIG. 13, the most uniform droplets with a span below 0.8 were obtained at the intermediate rotation speeds (600 and 800 rpm). Thus this may be a preferred rotation speed.

Figure 14:
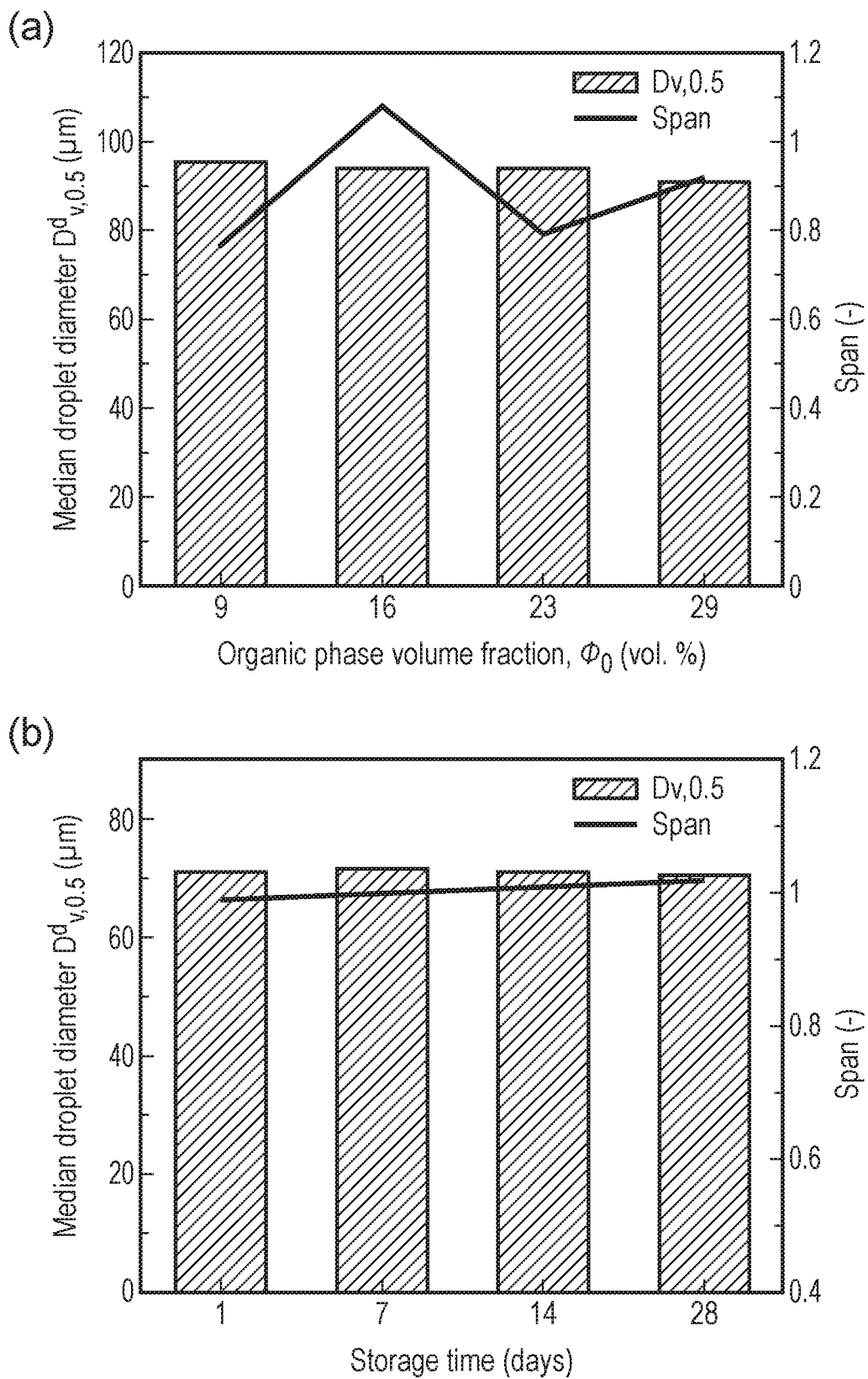
FIG. 14(a) shows the effect of dispersed phase content on median particle diameter and span and FIG. 14(b) shows long-term emulsion stability.

The effect of dispersed phase content $\phi_o$ in the prepared emulsion on $D_{v,0.5}^d$ and span at a stirring rate of 800 rpm and flux of 200 $Lm^{-2}\ h^{-1}$ is shown in FIG. 14a. No significant variations in $D_{v,0.5}^d$ were observed when $\phi_o$ increased from 9% to 29%. This behaviour can be attributed to the short injection time that ranged from less than 2 minutes at $\phi_o$=9 vol % to 7 minutes at $\phi_o$=29 vol % during which no significant changes in membrane fouling occurred. The most uniform emulsion droplets with a span of 0.76 were obtained at $\phi_o$ of 9%, but the uniformity at $\phi_o$=20 vol % was also observed and this was the dispersed phase content used for previously-discussed samples, because, as discussed with respect to FIG. 9, this content was found to be advantageous for maintaining particle uniformity during the suspension polymerization part of the production process.

The stability of emulsion droplets against coalescence over 4 weeks of storage at ambient temperature is shown in FIG. 14b. Since AIBN slowly decomposes at room temperature, in this stability study no AIBN was added in the organic phase, so as to prevent polymerisation during storage. No noticeable change in $D_{v,0.5}^d$ was observed over the entire 4-week period, implying stable emulsion formulation.

Figure 15:
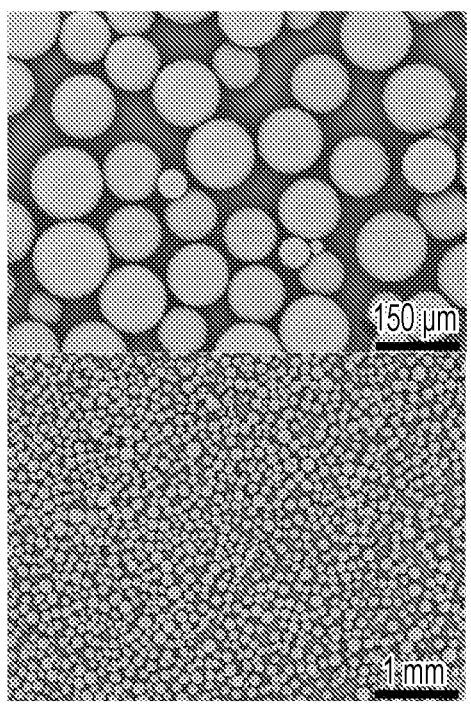
FIG. 15 shows SEM images of a prepared sample at two magnifications.

FIG. 15 shows SEM images of produced particles after downstream processing, i.e. surfactant removal and template extraction. All the particles are non-agglomerated, spherical and have a smooth surface without cracks.

Figure 16:
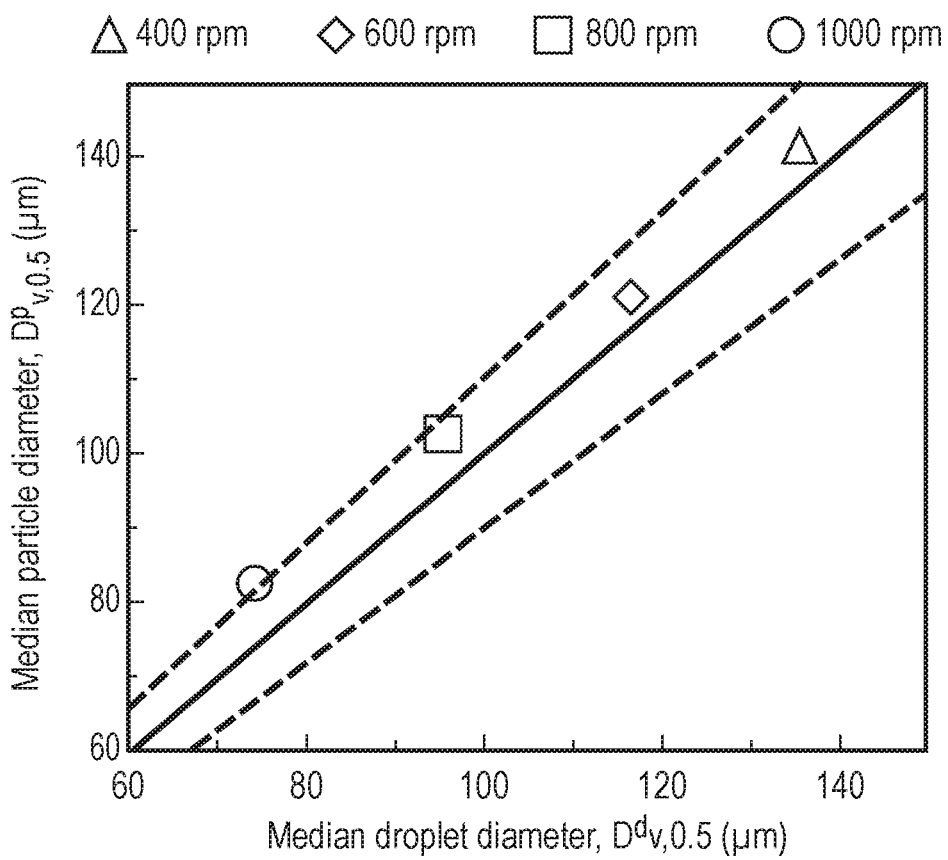
FIG. 16 shows a relationship between droplet diameter in a prepared emulsion and subsequent particle diameter following polymerization

FIG. 16 shows a relationship between the size of the droplets (annotated by d) before polymerization and the corresponding size of the particles (annotated by P) after polymerization and washing. The emulsions in these examples were prepared in a similar manner to previous samples, with a dispersed phase content of 23 vol % at $J_d$ of 200 $Lm^{-2}\ h^{-1}$ and 400-1000 rpm. The solid diagonal line indicates the data points for which $D_{v,0.5}^d$ is equal to $D_{v,0.5}^p$, and the two dashed lines represent ±10% deviation of $D_{v,0.5}^p$ from $D_{v,0.5}^d$. It can be seen that $D_{v,0.5}^p$ deviates from $D_{v,0.5}^d$ only by 4% for the largest droplets produced at 400 rpm. The deviation of $D_{v,0.5}^p$ from $D_{v,0.5}^d$ increases with decreasing droplet size and reaches 10% for the smallest droplets produced at 1000 rpm. This observation can be explained by the removal of very fine particles during washing, shifting the particle size distribution curve towards the larger particle sizes. The $D_{v,0.1}^d$ value for the droplets produced at 1000 and 400 rpm was 49.9 and 71.6 μm, respectively. After polymerisation and washing, the corresponding $D_{v,0.1}^p$ values were 66.5 and 83.1 μm (33% and 16% higher than the $D_{v,0.1}^d$ values), meaning that in the former case the fines were more substantially washed away.

Example Set II—Oil-in-Oil Emulsion

The following exemplary components were used for a series of examples as detailed in Table 3, which sets out formulation parameters and polymerization conditions:
Template—Oxalic acid (OA)
Monomer—acrylamide (AAm)
Cross-linker—Ethylene glycol dimethacrylate (EGDMA)
Initiator—azobisisobutyronitrile (AIBN)
Dispersed phase solvents (oil phase)—acetonitrile (AN)
Staining agent—fluorescein isothiocyanate isomer I (FITC)
Continuous phase liquid (oil phase)—light mineral oil
Continuous phase removal—toluene and methanol
Template removal—0.1M hydrochloric acid and methanol A 500-mL jacketed reactor equipped with a four-neck lid was used for the suspension polymerization. The emulsion was heated to 60° C. and agitated using a four-bladed impeller with a diameter of 50 mm, to cause emulsification.

In order to wash the polymeric particles, the mineral oil was separated from the suspension by centrifugation for 20 min at 3500 rpm using a Heraeus™ Labofuge™ 400 centrifuge (ThermoFisher Scientific Inc, Germany). The particles were then washed with toluene to remove the remaining mineral oil, rinsed with methanol, filtered in a Buchner funnel using a Whatman Grade 1 filter paper (11 μm retention), and dried overnight in a vacuum oven at 80° C.

Sample S3 was prepared as a comparative example without the use of a template and hence a dash is shown in the "OA" column. For the samples in which a template was used, it was removed from the polymer matrix by washing the particles with a 10/90 (v/v) mixture of 0.1 M hydrochloric acid and methanol, until no traces of OA were detected in the wash water by a Lambda 35 UV/VIS spectrometer (PerkinElmer, US). The particles were then washed with methanol, filtered in a Buchner funnel and dried overnight under vacuum at 80° C. The extraction of OA from the particles creates amide decorated cavities with CO2 recognition properties within the polymer network (as shown schematically in FIG. 17(e)). These cavities differ from the pores formed due to the phase separation between the porogenic solvent and the growing polymer chains during polymerisation.

Characterization of the Prepared Particles

Following self-assembly, the distance between adjacent $NH_2$ groups in the organic phase prior to polymerization was 0.45-0.7 nm, which is ideal for hydrogen bonding with $CO_2$ molecules, which have a kinematic diameter of 0.33 nm. Nitrogen adsorption-desorption isotherms and pore size distributions of the samples at 77 K are shown in FIG. 19. All samples followed the type II isotherm according to the IUPAC classification, which corresponds to multilayer adsorption on non-porous/macroporous solids. The process initially follows a Langmuir isotherm and the plateau region corresponds to monolayer coverage. A monolayer is completed near the point of inflection, after which adsorption occurs in successive layers. The pore size distribution data revealed that the samples had a variety of pores over the range of 2-80 nm, with a sharp peak at around 3.7 nm. The measured specific surface area, SBET, and pore volume, Vp, of the samples are listed in Table 3. An increase in the AAm content in the dispersed phase from 12 to 48 mmol caused a reduction in SBET and Vp from 187 to 88 m2/g, and 0.64 to 0.27 cm3/g, respectively. This trend can be attributed to a reduction in the degree of crosslinking of the polymer, and the presence of more amide groups in the interior of the polymer matrix.

Thermal Stability of the Particles

FIG. 20 shows TGA profiles of the samples. The thermal degradation temperature, Tdeg for S1-MIPs, S2-MIPs, and S3-MIPs was 351° C., 365° C., and 376° C., respectively. This indicates that the higher the AAm content in the pre-polymerisation mixture, the higher the density of amide groups in the polymer network, the higher the Tdeg value may be. To further investigate this trend, a polymer based on the S3-MIPs formulation but without any AAm (poly (EGDMA)) was synthesised, S-EGDMA (final sample in Table 3). In comparison with S3-MIPs, Tdeg of S-EDGMA of 283° C. was almost 25% lower, probably due to the presence of thermally labile ester bonds in EGDMA units, confirming that a higher proportion of AAm monomer in the network can result in higher thermal stability of the polymer.

More generally, the observed degradation temperatures were all well above a desorption temperature suitable for regeneration. Thus, as with Examples Set I, these inventive samples showed a good stability over many prior art materials, and thus that a good stability over multiple use and regeneration cycles would be expected and hence they have demonstrated a good level for criterion (4) of an ideal adsorbent discussed above i.e. low degradation rate.

Effect of Stirring Speed on Particle Size

As mentioned earlier in the Suspension Polymerization sub-section within the Method section, FIGS. 18($a$-$d$) shows the effect of agitation speed. More specifically, this figure (including FIG. 18($e$) discussed in some detail previously) shows SEM images of the morphology of the S2-MIP sample particles. The speeds were: (a) 300 rpm; (b) 600 rpm; (c) 800 rpm; (d) 1000 rpm. The scale bar for (a)-(d) is 500 μm.

An increase in the stirring speed from 300 to 1200 rpm caused a drastic reduction in the median particle diameter from 1208 to 375 μm. The higher agitation speeds created a higher shear stress at the interface, resulting in smaller particle sizes. The particles produced at agitation speeds of 600-1200 rpm, with a density of 1.3 g cm$^{-3}$ and a diameter up to 800 μm, belong to Group B of the Geldart classification, known as 'sandlike' or granular particles. These particles are generally easy to fluidise, with negligible channeling and spouting only in shallow beds, but they tend to form gas bubbles as soon as they are fluidised. The particles produced at 300 rpm with a diameter of 1.2 mm are more difficult to fluidise and belong to Group D, spoutable particles. The production yield of S1-MIPs, S2-MIPs, and S3-MIPs of 78%, 88%, and 91%, respectively, was significantly greater than that of MIPs synthesised through bulk polymerisation, in which case only 30-40% of the particles can be recovered after downstream processing.

These results demonstrate an important feature of the invention, namely that particle size can be readily controlled by stirring speed. This means that, with a straightforward adjustment of production conditions, the particle size of any given batch of particles can be tailored, at no extra cost, to the requirements of the type of bed in which they will be used. For example, should the larger particles of FIG. 18($a$) be required, for example for a non-fluidized bed, a low impeller speed of 300 rpm can be used. On the other hand, should fluidizable particles be required, the impeller speed can be set higher, so as to obtain particles across the size range of FIGS. (b)-(d). Thus these particles and the inventive production process have demonstrated a good achievement with regard to criteria (7) & (8) of an ideal adsorbent discussed above i.e. ability to be of optimum morphology and at low cost.

As previously discussed, a production method such as the one used for this Examples Set II can result in non-uniform, rounded particles. The "median diameter" discussed above with respect to the size of non-spherical particles allows for the fact that each such particle may have two or more diameters. For example, some structures obtained were generally cuboid in shape. The length to width ratio of one of the faces, for example a face visible in FIG. 2, might vary from around 1.2 to around 1.5. In such cases, both measurements were taken into account when calculating the median diameter, so as to obtain a measure of overall size of the particles.

Imprinting Factor of Synthesised Particles

The performance of the synthesised MIP particles was evaluated by means of the imprinting factor, IF, which is the ratio of the equilibrium $CO_2$ capture capacity of the imprinted sample, S3-MIPs, to that of its non-imprinted counterpart, S3-NIPs. FIG. 21($a$) shows the $CO_2$ adsorption isotherms of S3-MIPs and S3-NIPs at 273 K and 298 K. The imprinted sample, owing to the presence of amide-decorated imprinted cavities, had considerably larger $CO_2$ capture capacities over the entire range of $CO_2$ partial pressures and at both measured temperatures. FIG. 21($b$) shows the variation of IF at 273 K and 298 K over the $CO_2$ partial pressure range of 0-1 bar. It can be seen that the lower values of $CO_2$ partial pressure and adsorption temperature resulted in higher IFs. Over the $CO_2$ partial pressure of 0-0.15 bar, IF decreased from ~1.55 to 1.45 at 273 K, and from 1.3 to 1.25 at 298 K. With further increase in $CO_2$ partial pressure beyond 0.15 bar, a more gradual decrease in IF was seen at 273 K.

All these results demonstrate an improvement in $CO_2$ adsorption in the MIP sample, but nonetheless, the NIP sample demonstrates a useful degree of adsorption.

$CO_2$ Adsorption Capacity and $CO_2/N_2$ Selectivity of Synthesized Particles

The $CO_2$ uptake of the synthesised MIPs samples was measured at 273 K and 298 K and at $CO_2$ partial pressures up to 1 bar (FIGS. 22($a$) and ($b$)). The $CO_2$ adsorption capacity determined from the isotherms at 273 K was 0.9 mmol g$^{-1}$ for S1-MIPs, 1.1 mmol g$^{-1}$ for S2-MIPs, and 1 mmol g$^{-1}$ for S3-MIPs. The $CO_2$ capture capacity of S2-MIPs and S3-MIPs was similar, but greater than that of S1-MIPs. Since the $S_{BET}$ and $V_P$ values for S1-MIPs were higher than those for S2-MIPs and S3-MIPs, the lower $CO_2$ capture capacity of S1-MIPs can be attributed to a smaller number of amide interaction sites. At 298 K, the $CO_2$ capture capacity decreased to 0.51 mmol g$^{-1}$ for S1-MIPs, 0.6 mmol g$^{-1}$ for S2-MIPs, and 0.6 mmol g$^{-1}$ for S3-MIPs. The lower $CO_2$ capture capacity at higher temperature can be attributed to the weaker dipole-dipole interactions between $CO_2$ molecules and polar N—H and C=O moieties within the polymer network. Nonetheless, these results show a good adsorption capacity at 298K/40° C., which is standard flue gas temperature. Moreover, the results suggest that a good adsorption capability can be expected over a wider temperature range, such as −30° C. to 80° C. and narrower ranges within that. All the results indicate an adsorption capacity that is good in terms of meeting criteria (2) & (3) of an ideal adsorbent i.e. high capacity and high selectivity. In particular with regard to selectivity, an improvement over many prior art adsorbents has been demonstrated.

In FIGS. 22(c) and (d), the $CO_2/N_2$ selectivity (separation factor), S, of the samples at 273 K and 298 K was plotted against $CO_2$ partial pressure. The S values were calculated from the adsorption isotherms of $CO_2$ and $N_2$ shown in FIGS. 22(a) and (b) using Eq. (6), based on the Ideal Adsorbed Solution Theory (IAST):

$$S = \frac{q_{CO_2}/P_{CO_2}}{q_{N_2}/P_{N_2}} \qquad (6)$$

where q and P are the equilibrium adsorption capacity and partial pressure of gas species, respectively. At 273 K and for $CO_2$ partial pressures of 0-0.2 bar, the highest $CO_2/N_2$ selectivity of 97-40 was observed for S3-MIPs, followed by 75-38 for S2-MIPs, and 70-37 for S1-MIPs. At $CO_2$ partial pressures above 0.2 bar, the selectivity was almost identical for all samples. At low partial pressure, the interactions between $CO_2$ molecules and $CO_2$-philic amide groups are important for $CO_2$ uptake. This is because, when $CO_2$ interacts with amides, it can behave as both a Lewis acid (LA) and a Lewis base (LB). Thus $CO_2$ acts as a LA in LA($CO_2$)-LB(C=O) interaction and as a LB in hydrogen bonding interaction with the acidic N—H proton.

At low partial pressures, the higher selectivity of S3-MIPs compared to S2-MIPs and S1-MIPs was likely due to larger number of interaction sites (amide groups) available in the polymeric network. Whilst some decrease in selectivity was observed at the higher temperature of 298 K at $CO_2$ partial pressures of 0-0.2 bar, due to the weaker hydrogen-bond interactions of $CO_2$ with amide groups, the results as a whole are evidence of good $CO_2$ selectivity per criterion (3).

The purity of the gas stream after regeneration depends on adsorbent selectivity, and for any concentration of $CO_2$ in flue gas, can be estimated using Eq. (7):

$$Purity = \frac{q_{CO_2}}{q_{N_2} + q_{CO_2}} \times 100 \ (\%) \qquad (7)$$

At a $CO_2$ partial pressure of 0.15 bar, which is the typical $CO_2$ concentration of flue gases from coal-fired power stations, the corresponding purities that can be achieved using S3-MIPs, S2-MIPs, and S1-MIPs are 91%, 90%, and 89% at 273 K, and 90%, 89%, and 87% at 298 K. Therefore, S3-MIPs can satisfy the required purity of gas streams for sequestration.

The isosteric heat (enthalpy) of adsorption, $Q_{st}$ (kJ mol$^{-1}$) was calculated, using the Clausius-Clapeyron equation, from the $CO_2$ isotherm data at 273 and 298 K for different amounts of $CO_2$ absorbed (FIG. 23(a)). For all samples, $Q_{st}$ was lower than 32 kJ mol$^{-1}$, which is a 64% reduction in heat of adsorption, compared to the MEA prior art adsorbents discussed above. This implies that all the samples can meet the energy requirement framework defined by the National Energy Technology Laboratory. The highest $Q_{st}$ value was achieved for S3-MIPs, followed by S2-MIPs and S1-MIPs. Higher $Q_{st}$ values are associated with higher affinity towards $CO_2$. FIG. 23(b) shows, by way of example, the cyclic stability of $CO_2$ adsorption capacity of the S2-MIPs. The adsorption was performed at 298 K and 0.15 bar $CO_2$ partial pressure, and the desorption was carried out in a stream of pure $N_2$ at 393 K. The $CO_2$ adsorption capacity was highly stable and there was only a 2.3% reduction in adsorption capacity over 10 consecutive cycles.

The results shown in FIG. 23 demonstrate a good match for criterion (1) of the ideal adsorbent criteria i.e. low heat of adsorption.

For completeness, it is noted that the FTIR spectra of samples in this Example Set II were also analysed as for Example Set I. The results demonstrated good working of the production process as per Example Set I. Moreover, the nanocavity size and size uniformity were also found to be similar to Examples Set I. In order to avoid repetition, details of these analyses are not reproduced here.

It will be appreciated that the good uniformity of particle size prepared by various techniques discussed in the examples herein is advantageous over other preparation methods, since a majority of the material is useable and hence less wastage occurs. The ability to select mean particle size in a cost-effective manner assists with this improvement.

Many implementations of the current subject-matter, which may include the techniques discussed above in any feasible combination, provide polymeric particles with improved surface morphology, porosity, $CO_2$ capture capacity, and enabling production scalability. Such materials can be highly selective to $CO_2$ due to shape specificity of the nanocavities and the presence of $CO_2$-philic groups covalently incorporated within the 3D network of the cross-linked polymer/polymer matrix.

It can be understood from the description above and the examples that many implementations of the present invention have at least some of the following advantages and therefore provide an excellent balance between the various ideal adsorbent criteria discussed above:

- Production of highly $CO_2$ selective material with high thermal stability in comparison to some prior art materials such as MOFs, activated carbons or silica-based adsorbents.
- Insensitivity to impurities such as $O_2$, $SO_x$, $NO_x$ and steam ($H_2O$) as compared to some prior art materials such as MOFs and zeolites.
- Production techniques which can be easily scaled-up and can accelerate the termination of the polymerization process (in some cases up to 8 times faster than prior art techniques such as bulk polymerization)
- Good conversion of component materials, thus increasing the production yield
- Improved, active control on the size and shape of particles, reducing the waste of material in downstream processing, and improving the material morphology against mechanical attrition in comparison with prior art processes such as bulk polymerisation.
- Production of particles which were of a size and density within a range suitable for $CO_2$ capture in fixed bed and fluidized bed systems.
- Production of a hydrothermally stable polymeric material, which allows a lower regeneration energy than some prior art materials and avoids solvent evaporation into the atmosphere
- System corrosion can be avoided
- Particles having a higher surface to volume ratio than some prior art materials, and a high density of active sites, thus requiring a smaller capture system.

The skilled reader will appreciate that the techniques described herein could be applied to many gases to produce polymeric materials which are selective for adsorption of a particular gas or gases. This could be achieved by suitable selection of substances in the production process. Other non-limiting examples of gases which it may be useful to capture by such materials include carbon monoxide, nitric oxide, nitrogen dioxide, hydrogen and various $SO_x$ gases.

Furthermore, the techniques described herein are capable of being scaled up to large-scale production. One reason this is possible due to the use of suspension polymerization. Membrane emulsification processes are also suitable for large-scale use.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

TABLE 1

Formulations for molecularly imprinted polymers. The same formulations were used for Non-imprinted polymers, except no template was used.

| Template | Monomer | Crosslinker | Initiator |
| --- | --- | --- | --- |
| Oxalic acid | Acrylamide | Ethylene glycol dimethacrylate | Azobisisobutyronitrile/ Perkadox 16 |
| Oxalic acid | Methacrylamide | Ethylene glycol dimethacrylate | Azobisisobutyronitrile/ Perkadox 16 |
| Oxalic acid | Allylamine | Ethylene glycol dimethacrylate | Azobisisobutyronitrile/ Perkadox 16 |
| Oxalic acid | 4-vinylaniline | Ethylene glycol dimethacrylate | Azobisisobutyronitrile/ Perkadox 16 |
| Oxalic acid | N-Allylaniline | Ethylene glycol dimethacrylate | Azobisisobutyronitrile/ Perkadox 16 |
| Oxalic acid | Diallylamine | Ethylene glycol dimethacrylate | Azobisisobutyronitrile/ Perkadox 16 |
| Oxalic acid | Triallylamine | Ethylene glycol dimethacrylate | Azobisisobutyronitrile/ Perkadox 16 |
| Formic acid | Acrylamide | Ethylene glycol dimethacrylate | Azobisisobutyronitrile/ Perkadox 16 |
| Formic acid | Methacrylamide | Ethylene glycol dimethacrylate | Azobisisobutyronitrile/ Perkadox 16 |
| Formic acid | Allylamine | Ethylene glycol dimethacrylate | Azobisisobutyronitrile/ Perkadox 16 |
| Formic acid | 4-vinylaniline | Ethylene glycol dimethacrylate | Azobisisobutyronitrile/ Perkadox 16 |
| Formic acid | N-Allylaniline | Ethylene glycol dimethacrylate | Azobisisobutyronitrile/ Perkadox 16 |
| Formic acid | Diallylamine | Ethylene glycol dimethacrylate | Azobisisobutyronitrile/ Perkadox 16 |
| Formic acid | Triallylamine | Ethylene glycol dimethacrylate | Azobisisobutyronitrile/ Perkadox 16 |
| Oxalic acid | Acrylamide | N,N-methylenebisacrylamide (N,N) | Ammonium persulfate |
| Oxalic acid | Methacrylamide | N,N-methylenebisacrylamide (N,N) | Ammonium persulfate |
| Oxalic acid | Allylamine | N,N-methylenebisacrylamide (N,N) | Ammonium persulfate |
| Formic acid | Acrylamide | N,N-methylenebisacrylamide (N,N) | Ammonium persulfate |
| Formic acid | Methacrylamide | N,N-methylenebisacrylamide (N,N) | Ammonium persulfate |
| Formic acid | Allylamine | N,N-methylenebisacrylamide (N,N) | Ammonium persulfate |

TABLE 2

Summary of material contents and polymerization conditions of samples synthetized for $CO_2$ capture capacity measurements.

| Sample | AAM (g) | OA (g) | EGDMA (g) | AIBN (g) | Solvent (ml) AN | Solvent (ml) TL | $T_p$ (°C.) | $t_p$ (h) | $\phi_o$ (%) | Dv, 0.5 (μm) | $S_{BET}$ (m²/g) | $V_p$ (Cm³/g) | $d_p$ (nm) |
| --- | --- | --- | --- | --- | --- | --- | --- | --- | --- | --- | --- | --- | --- |
| b.1 | 5.1 | 2.27 | 23.8 | 0.3 | 30 | 30 | 60 | 3 | 20 | 144 | 330 | 0.48 | 7.3 |
| b.2 | 10.2 | — | 23.8 | 0.3 | 30 | 30 | 60 | 3 | 20 | 160 | 328 | 0.62 | 9.6 |

TABLE 2-continued

Summary of material contents and polymerization conditions of samples synthetized for $CO_2$ capture capacity measurements.

| Sample | AAM (g) | OA (g) | EGDMA (g) | AIBN (g) | Solvent (ml) AN | Solvent (ml) TL | $T_p$ (° C.) | $t_p$ (h) | $\phi_o$ (%) | Dv, 0.5 (μm) | $S_{BET}$ (m²/g) | $V_p$ (Cm³/g) | $d_p$ (nm) |
|---|---|---|---|---|---|---|---|---|---|---|---|---|---|
| b.3 | 10.2 | 4.54 | 23.8 | 0.3 | 30 | 30 | 60 | 3 | 20 | 211 | 367 | 0.64 | 9.4 |
| b.4 | 5.1 | 2.27 | 23.8 | 0.3 | 18 | 42 | 60 | 3 | 20 | 178 | 443 | 0.92 | 15 |

$T_p$ = polymerization temperature; $t_p$ = polymerization time, $\phi_o$ = dispersed phase content; $S_{BET}$ = specific surface area, $V_p$ = pore volume, $d_p$ = average pore size, $D_{v, 0.5}$ is the diameter corresponding to 50% on the cumulative volume distribution curve. In all experiments the PVA concentration in the aqueous phase was 0.5 wt % and the stirring rate was 200 rpm.

TABLE 3

The dispersed phase compositions, and the specific surface areas and pore volumes of the synthesised poly(AAm-co-EGDMA) particles.[a]

| Sample | AAm (mmol) | OA (mmol) | EGDMA (mmol) | AIBN (mmol) | $S_{BET}$ (m²/g) | $V_p$ (cm³/g) |
|---|---|---|---|---|---|---|
| S1-MIPs | 12 | 3 | 60 | 3.6 | 187 | 0.64 |
| S2-MIPs | 24 | 3 | 60 | 3.6 | 168 | 0.43 |
| S3-MIPs | 48 | 3 | 60 | 3.6 | 88 | 0.27 |
| S3-NIPs | 48 | — | 60 | 3.6 | 127 | 0.39 |
| S-EGDMA | — | — | 60 | 3.6 | — | — |

[a]$S_{BET}$ is the specific surface area and $V_p$ is the pore volume. Continuous phase: 160 mL of light mineral oil; Porogenic solvent: 30 mL of AN; Polymerisation time: 3 h; Polymerisation temperature: 60° C.; Agitation speed: 800 rpm.

The invention claimed is:

1. A method of making a polymeric material for selective adsorption of carbon dioxide, the method comprising:
dissolving a monomer comprising a functional group having a greater affinity for carbon dioxide molecules than other molecules in a mixed gas stream in a solvent with a cross-linker and an initiator to form a solution, wherein the dissolving comprises mixing with a template comprising molecules that are structurally similar to molecules of the mixed gas stream such that monomer-template complexes are formed, the molecules of the template being a structural analogue of one or more molecules of the mixed gas stream;
emulsifying the solution in a liquid that is immiscible with the solvent to form an emulsion; and
agitating and providing thermal or light energy to the emulsion to cause polymerization of droplets of the solution into particles of a cross-linked polymer having nanocavities with carbon dioxide-philic functional groups covalently-incorporated on walls thereof onto which molecules of carbon dioxide are able to be selectively adsorbed, the particles having a specific surface area $S_{BET}$ of 328-443 m²/g, wherein the carbon dioxide-philic functional groups are one of an amide group, an amine group, a carboxyl group, and a hydroxyl group,
wherein each of the nanocavities is sized and shaped to be structurally complementary with two carbon dioxide molecules due to a distance between the carbon dioxide-philic functional groups within the nanocavities sufficient for two kinematic diameters of 0.33 nm to facilitate selective adsorption of the carbon dioxide molecules by entrapment and bonding of the carbon dioxide molecules into the nanocavities.

2. The method of claim 1, wherein the emulsion includes acetonitrile as a dispersed phase and mineral oil as a continuous phase.

3. The method of claim 1, further comprising washing the cross-linked polymer by mechanical agitation and/or ultrasonic agitation to remove unreacted reagents and a continuous phase of the emulsion.

4. The method of claim 1, wherein the emulsifying comprises forcing the solution through a porous membrane and forming substantially uniformly-sized droplets by controlling a rate of flow through the porous membrane and a shear force imposed on a surface of the porous membrane.

5. The method of claim 1, further comprising removing the template, thereby leaving the nanocavities with the carbon dioxide-philic functional groups having an affinity to carbon dioxide molecules.

6. The method of claim 1, wherein the solvent comprises a porogenic solvent in which the monomer, the template, the cross-linker and the initiator have a solubility that promotes homogeneity of the solution.

7. A material for selective adsorption of carbon dioxide, the material comprising particles of polymerized droplets of uniform or substantially uniform sphericity formed from a cross linked polymer and having nanocavities with carbon dioxide-philic functional groups having a greater affinity for carbon dioxide molecules than other molecules in a mixed gas stream, the particles having a specific surface area $S_{BET}$ of 328-443 m²/g, the carbon dioxide-philic functional groups covalently incorporated on walls of the nanocavities, onto which molecules of carbon dioxide are able to be selectively adsorbed,
wherein each of the nanocavities is sized and shaped to be structurally complementary with two carbon dioxide molecules due to a distance between the carbon dioxide-philic functional groups within the nanocavities sufficient for two kinematic diameters of 0.33 nm to facilitate selective adsorption of the carbon dioxide molecules by entrapment of the carbon dioxide molecules into the nanocavities,
wherein the carbon dioxide-philic functional groups is one of an amide group, an amine group, a carboxyl group, and a hydroxyl group.

8. The material of claim 7, wherein the nanocavities are smaller than 2 nm.

9. The material of claim 7, wherein the particles are insoluble in water and able to regenerate by removal of adsorbed carbon dioxide molecules using temperature and pressure manipulations.

10. A material for selective adsorption of carbon dioxide, the material comprising particles of polymerized droplets of irregular, rounded shape formed from clustered and partially-fused spherical or substantially spherical polymer particles and having nanocavities with carbon dioxide-philic functional groups having a greater affinity for carbon dioxide molecules than other molecules in a mixed gas stream, the particles having a specific surface area $S_{BET}$ of 328-443 m²/g, the carbon dioxide-philic functional groups covalently incorporated on walls of the nanocavities, onto which molecules of carbon dioxide are able to be selectively adsorbed, wherein each of the nanocavities is sized and shaped to be structurally complementary with two carbon dioxide molecules due to a distance between the carbon dioxide-philic functional groups within the nanocavities sufficient for two kinematic diameters of 0.33 nm to facilitate selective adsorption of the carbon dioxide molecules by entrapment of the carbon dioxide molecules into the nanocavities, wherein the carbon dioxide-philic functional groups is one of an amide group, an amine group, a carboxyl group, and a hydroxyl group.

11. The material of claim 10, wherein the particles comprise a structure formed from multiple partially-coalesced droplets clustered together, each of the droplets comprising multiple monomer molecules.

12. The material of claim 11, wherein each of the droplets is a mixture additionally comprising a template, a solvent, an initiator, and a across linker, the solvent, the initiator, and the cross-linker having been used to form the particles.

13. The material of claim 10, wherein the particles are insoluble in water and are able to regenerate by removal of adsorbed gas molecules using temperature and pressure manipulations.

14. A method of adsorbing a selected gas from a gas stream comprising a mixture of gases, the method comprising flowing the gas stream past the material of claim 10.

15. The material of claim 7, wherein the carbon dioxide-philic functional groups are incorporated on the walls of the nanocavities in a spatial arrangement that forms a cavity having a shape, size, and the carbon dioxide-philic functional groups complementary to and able to receive the two carbon dioxide molecules, such that each carbon dioxide molecule is able to be adsorbed by one of the carbon dioxide-philic functional groups.

16. The material of claim 7, wherein the nanocavities are formed by molecular imprinting using a template comprising a molecule that is a structural analogue to the two carbon dioxide molecules.

17. The material of claim 16, wherein the template is low molecular weight carboxylic acid having a molecular weight of between approximately 46 g/mole and 200 g/mole.

18. The material of claim 17, wherein the template is oxalic acid or formic acid.

19. The material of claim 16, wherein each carbon dioxide-philic functional group within the nanocavities is spaced a distance from one another in a range suitable for two carbon dioxide molecules to each be adsorbed by a carbon dioxide-philic functional group within each of the nanocavities.

20. The material of claim 7, wherein at least half of the particles by volume have a diameter of approximately 350 microns to 800 microns.

21. The material of claim 7, wherein the material is an adsorbent for low-temperature post-combustion capture of carbon dioxide by chemisorption and at a heat of adsorption that is greater than 40 kJ mol.

22. The material of claim 7, wherein the carbon dioxide-philic functional groups within each of the nanocavities have a polarity and quadrupole moment that attract and result in hydrogen bonds with carbon dioxide molecules.

23. The material of claim 7, wherein the material has a carbon dioxide adsorption capacity that ranges from at least 0.28 mmol/g to 0.62 mmol/g at temperatures ranging from 25° C. to 80° C. in the mixed gas stream.

24. The material of claim 7, wherein the cross-linked polymer is formed by polymerization of a monomer selected from the group consisting of acrylamide, methacrylamide, allylamine, 4-vinylaniline, N-Allylaniline, diallylamine, and triallylamine.

* * * * *